(12) United States Patent
Grigoras

(10) Patent No.: US 12,326,789 B2
(45) Date of Patent: Jun. 10, 2025

(54) REMOTELY BACKING UP DEVICE DATA USING A WEB APPLICATION AT A REMOTE DEVICE

(71) Applicant: Dropbox, Inc., San Francisco, CA (US)

(72) Inventor: Alexandru Grigoras, Lake Worth, FL (US)

(73) Assignee: Dropbox, Inc., San Francisco, CA (US)

( * ) Notice: Subject to any disclaimer, the term of this patent is extended or adjusted under 35 U.S.C. 154(b) by 49 days.

(21) Appl. No.: 18/173,635

(22) Filed: Feb. 23, 2023

(65) Prior Publication Data

US 2024/0289233 A1 Aug. 29, 2024

(51) Int. Cl.
*G06F 11/14* (2006.01)
(52) U.S. Cl.
CPC ...... *G06F 11/1464* (2013.01); *G06F 11/1461* (2013.01); *G06F 2201/84* (2013.01)
(58) Field of Classification Search
CPC ............ G06F 11/1464; G06F 11/1461; G06F 2201/84
USPC ........................................................ 707/654
See application file for complete search history.

(56) References Cited

U.S. PATENT DOCUMENTS

| | | | |
|---|---|---|---|
| 8,244,678 B1 * | 8/2012 | Hartland | H04L 67/1095 707/610 |
| 8,467,768 B2 | 6/2013 | Mahaffey et al. | |
| 8,589,798 B2 | 11/2013 | Prahlad et al. | |
| 9,807,064 B2 | 10/2017 | Barton et al. | |
| 10,389,720 B2 | 8/2019 | Lee et al. | |
| 10,389,822 B2 | 8/2019 | Innes | |
| 10,397,330 B2 | 8/2019 | Mo et al. | |
| 10,455,015 B2 | 10/2019 | Procopio et al. | |
| 11,537,480 B1 * | 12/2022 | Sergeev | G06F 11/1451 |
| 2015/0304306 A1 * | 10/2015 | Ponsford | H04L 63/045 713/193 |
| 2021/0049077 A1 * | 2/2021 | Gibbons, Jr. | G06F 11/3058 |
| 2022/0188273 A1 * | 6/2022 | Koorapati | G06F 16/9574 |
| 2024/0078167 A1 * | 3/2024 | Keller | G06F 11/3608 |

OTHER PUBLICATIONS

International Search Report and Written Opinion for Application No. PCT/US2023/079897, mailed on Mar. 28, 2024, 11 pages.

* cited by examiner

*Primary Examiner* — Giovanna B Colan
(74) *Attorney, Agent, or Firm* — Keller Preece PLLC

(57) ABSTRACT

The present disclosure is directed toward systems, methods, and non-transitory computer-readable media for initiating, monitoring, and performing data backups from remote devices using web-based applications. For example, the disclosed systems receive a backup request from a remote device running a web-based application that does not include backup functionality, where the backup request triggers a data backup for data stored locally on a different client device. In some embodiments, the disclosed systems can establish a connection between the remote web-based application and a desktop application installed locally on the device to be backed up, where the connection facilitates triggering and managing a data backup executed by the desktop application via the remote web-based application. In some cases, the disclosed systems determine whether data backups are synchronous, asynchronous, and/or for user accounts within a team, and the disclosed systems facilitate data backups accordingly.

20 Claims, 14 Drawing Sheets

REMOTELY BACKING UP DEVICE DATA USING A WEB APPLICATION AT A REMOTE DEVICE

BACKGROUND

Advancements in computing devices and networking technology have given rise to a variety of innovations in cloud-based digital content storage and sharing. For example, online digital content systems can provide access to digital content items across devices all over the world. Existing systems can also synchronize changes to shared digital content across different types of devices operating on different platforms. Indeed, modern online digital content systems can provide access to digital content for users to collaborate across diverse physical locations and over a variety of computing devices. Despite these advances, however, existing digital content systems continue to suffer from a number of disadvantages, particularly in terms of flexibility, efficiency, and data security.

As just suggested, certain existing digital content systems are inflexible. More particularly, when performing data backups, existing systems are often device-specific and are therefore fixed to backing up data stored locally on the device that originates a backup request. To elaborate, backing up data in existing systems frequently requires internal mechanisms that are native to, and/or hosted by, the same system or device that stores the data to be backed up. Additionally, many existing systems facilitate backups utilizing only specific, full-function computer applications that are installed on the devices initiating data backups. Consequently, existing systems can perform data backups for specific devices using applications with backup functionality, but they cannot flexibly adapt for cross-device (or cross-application) backup compatibility to back up data external to a device requesting a backup, especially not where the request originates via an application that does not natively include backup functionality.

Due at least in part to their inflexibility, some existing digital content systems are inefficient. More specifically, certain existing systems waste computing resources such as processing power and memory by forcing computing devices and data networks to initiate data backups independently for each data backup. These days, users often use multiple devices for different tasks in a single day, such as work computers and home computers. For even a single user, each of these devices stores and maintains its own data for a respective user account associated with the user. To back up such data, these existing systems often require independent operation of, and interaction with, different backup applications installed on each respective device to initiate data backups. Opening and operating each backup application on its respective device consumes large amounts of computer storage and processing power as even a single user backs up data across numerous devices.

Additionally, existing systems often provide inefficient user interfaces that require excessive numbers of user interactions to access desired data and/or functionality. For example, some existing systems fragment functionality across different platforms or types of user interfaces. To elaborate, existing systems often provide one set of functions within a desktop version of a backup application and provide another set of functions within a web-based version of the backup application, where some or all of the functions within the two sets are mutually exclusive. For instance, some desktop versions of a backup application facilitate creating, pausing, resuming, changing the backup data for, and viewing the progress/status of, a data backup while web-based versions facilitate browsing backup contents, viewing and restoring deleted files, and recovering previous versions of a file or a folder. Due to this fragmented nature, these existing systems sometimes require users to navigate between the different applications (on the same device or different devices) to access and execute all of the backup functions required for a backup task. Forcing such back-and-forth navigation not only requires excessive numbers of user interactions but further wastes computer resources processing the many user interactions (within different applications) to execute the platform-specific backup functions.

As a further example of their inefficient user interfaces, because existing systems are device-specific and back up device data stored within their own environments or their own local storage, these systems often require their own computer applications and interfaces for accessing and backing up the device data. As a result, such systems waste computing resources by processing the excessive numbers of user interactions for navigating through the many layers of applications and interfaces (e.g., on separate devices) to access and back up each set of device-specific data for a given user. Such inefficiencies are especially apparent in systems that facilitate backup of team data, where each team member initiates backup of team-specific data stored on their own respective device. Not only is such a system inefficient but it is also insecure, as relying on team members to independently initiate data backups often results in untimely backups and/or data loss when backups do not occur.

SUMMARY

This disclosure describes one or more embodiments of systems, methods, and non-transitory computer-readable storage media that provide benefits and/or solve one or more of the foregoing and other problems in the art. For instance, the disclosed systems initiate, monitor, and perform data backups from remote devices using web-based applications. For example, the disclosed systems receive a backup request from a remote device running a web-based application that does not include backup functionality, where the backup request triggers a data backup for data stored locally on a different client device. In some embodiments, the disclosed systems can establish a connection between the remote web-based application and a desktop application installed locally on the device to be backed up, where the connection facilitates triggering and managing a data backup executed by the desktop application via the remote web-based application. In some cases, the disclosed systems determine whether data backups are synchronous, asynchronous, and/or for user accounts within a team, and the disclosed systems facilitate data backups accordingly.

Additional features of the disclosed systems are described below.

BRIEF DESCRIPTION OF THE DRAWINGS

This disclosure will describe one or more example implementations of the systems and methods with additional specificity and detail by referencing the accompanying figures. The following paragraphs briefly describe those figures, in which.

DETAILED DESCRIPTION

Figure 1:
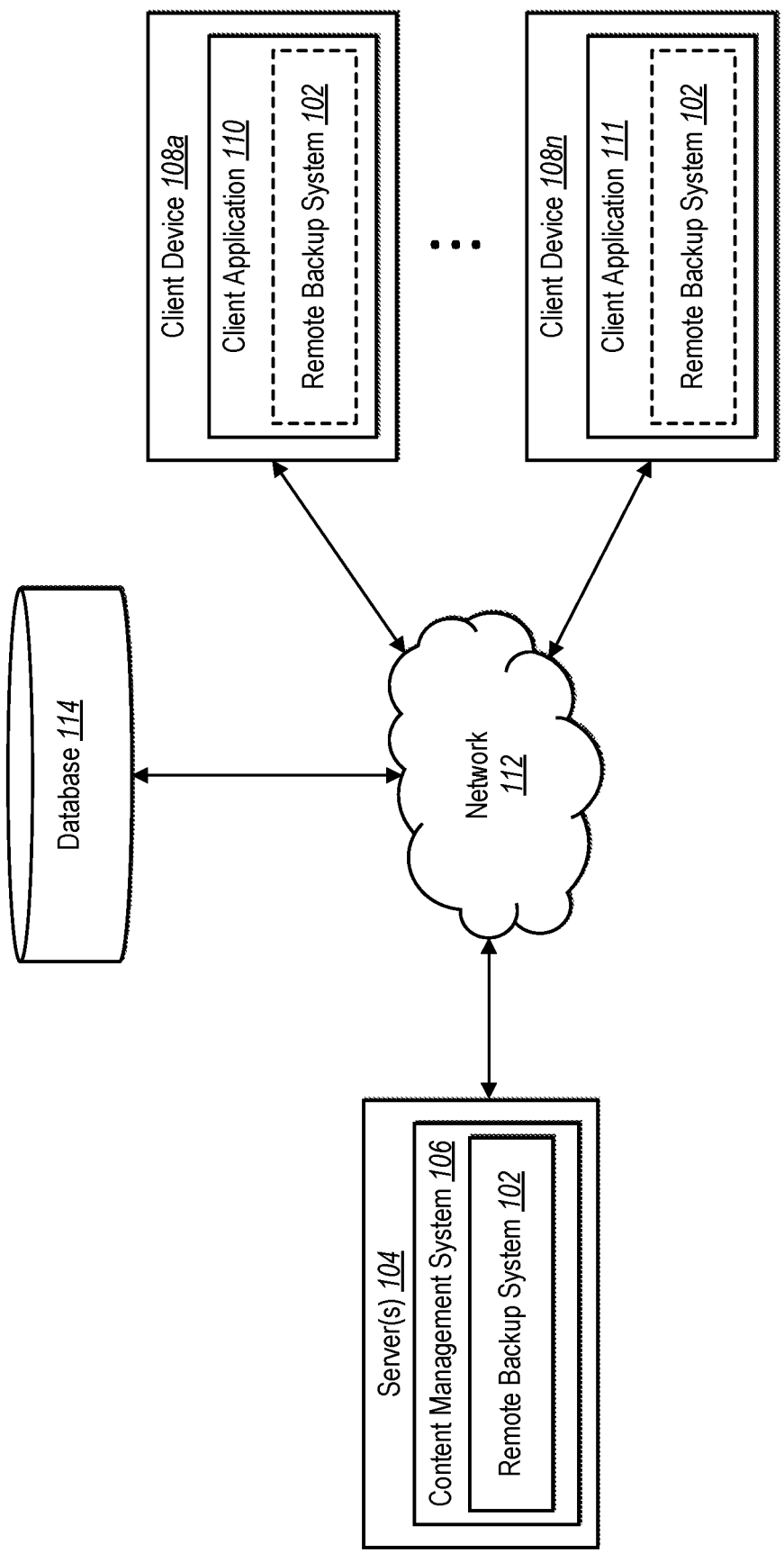
FIG. 1 illustrates a schematic diagram of an example environment of a remote backup system in accordance with one or more embodiments.

This disclosure describes one or more embodiments of a remote backup system that can create, manage, and monitor a data backup using a remote device running a web-based application paired with or connected to a desktop application running at a backup device. To facilitate remote data backups, the remote backup system can be part of (or work together with) a content management system that uses cloud-based data storage to manage and maintain data backups for various devices associated with user accounts (e.g., to back up content items of the user accounts within the content management system). In particular, the remote backup system can receive a backup request from a first client device associated with a user account to initiate a data backup for backing up content items stored at a second client device associated with the user account, where the first and second devices are located remotely from one another and communicate via a network connection. In some cases, the remote backup system receives the backup request via a web-based application (e.g., from a browser or a mobile application) that does not include backup functionality. To perform the requested data backup, the remote backup system can establish a connection between the web-based application at the remote device (e.g., the device requesting the backup) and a desktop application installed on the device storing the content items to be backed up, where the desktop application includes backup functionality to perform the data backup.

As just mentioned, the remote backup system can perform remote data backups using a web-based application on a remote device to initiate and manage backing up content items stored locally on a separate device. To elaborate, the remote backup system establishes a connection between the web-based application and a desktop application on the device storing the content items. Using the connection (e.g., web sockets or long polling), the remote backup system can access and execute desktop-application-specific functions at the desktop application from the web-based application at the remote device. Accordingly, the remote backup system can initiate, manage, and monitor a data backup to back up the content items stored at the device running the desktop application in response to a backup request originating from a web-based application on a remote device.

In some embodiments, the remote backup system performs data backups based on the status of the desktop application and/or the device storing the data to be backed up. For example, in some cases, the remote backup system performs synchronous data backups where a desktop application installed on the device storing the content items to be backed up is online and accessible by the web-based application on the remote device. To elaborate, the remote backup system can determine that a device to be backed up is powered on and accessible via a network (e.g., online). The remote backup system can further determine that the device includes a desktop backup application that includes backup functionality and that is accessible via a network. Based on such determinations, the remote backup system can perform a synchronous backup operation where content items are backed up to the content management system in (immediate) response to a backup request.

In one or more embodiments, the remote backup system performs an asynchronous backup operation. To elaborate, the remote backup system can determine that a device to be backed up is powered off and/or inaccessible via a network (e.g., offline). The remote backup system can further determine that the device does not include a desktop backup application that includes backup functionality and/or that a desktop backup application is inaccessible via a network. Based on such determinations, the remote backup system can perform an asynchronous backup operation where content items are scheduled for backup to the content management system in response to a backup request.

In certain embodiments, the remote backup system performs a team backup operation. For example, the remote backup system identifies user accounts that are part of team with one or more administrator accounts. The remote backup system can also determine devices associated with the team accounts and, in response to a team backup request from an administrator account (e.g., a team account with permissions to initiate a team-wide backup), the remote backup system can back up data from client devices associated with team members. In some cases, the remote backup system performs a synchronous team backup operation or an asynchronous team backup operation (or a combination thereof), depending on the accessibility of devices and/or desktop backup applications associated with team accounts.

As suggested above, the remote backup system can provide several improvements or advantages over existing digital content systems. For example, the remote backup system can provide improved flexibility over existing systems. While many existing systems are platform-specific or device-specific and cannot perform data backups remotely from devices other than the device to be backed up, the remote backup system can flexibly adapt for cross-application and cross-platform data backups, even from remote devices. Indeed, the remote backup system can utilize a remote application running a web-based application (e.g., an application that does not include backup functionality) to relay a backup instruction to a desktop application (e.g., an application with backup functionality) installed on a different device to be backed up. The remote backup system can thus flexibly create, manage, and monitor data backups from remote mobile devices or other devices while backing up data locally stored on a different device.

Due at least in part to improving flexibility over prior digital content systems, the remote backup system can also improve efficiency. To elaborate, rather than wasting resources by initiating data backups at each device independently, the remote backup system can utilize a single, remote device to more efficiently initiate data backups for multiple devices. Indeed, for a given user of the content management system, the remote backup system can initiate, manage, and monitor backups through establishing connections between a single mobile web-based application (at a single device) and desktop applications at multiple devices to be backed up. Thus, the remote backup system conserves computing resources by facilitating backup creation and management for multiple backups (at different devices) using a single device.

Along these lines, the remote backup system can also provide more efficient user interfaces than prior digital content systems. Whereas existing systems often fragment functionality across desktop and web-based versions of a backup application, the remote backup system can aggregate the functionality of both application versions into a single user interface. Indeed, the remote backup system can provide access to desktop application functions via a web-based application by establishing a connection between the applications (e.g., via web sockets or long polling), thereby providing functions for creating, pausing, resuming, changing the backup data for, and viewing the progress/status of, a data backup while also facilitating browsing backup contents, viewing and restoring deleted files, and recovering previous versions of a file or a folder in a single place. Thus, the remote backup system requires fewer user interactions to access desired data and/or functionality for managing data backups while also consuming fewer computing resources by processing fewer interactions.

As an additional example of more efficient user interfaces, the remote backup system solves the problem of prior systems that perform backups only for content stored locally on devices initiating a backup. For example, the remote backup system can provide a backup interface that facilitates backup management across multiple devices in a single location, rather than require separate interfaces on separate devices for each backup. Such efficiency improvements are especially apparent in team backup scenarios where the remote backup system provides a single backup interface for managing data backups across multiple team devices.

As illustrated by the foregoing discussion, the present disclosure utilizes a variety of terms to describe features and benefits of the remote backup system. Additional detail is hereafter provided regarding the meaning of these terms as used in this disclosure. As used herein, the term "digital content item" (or simply "content item") refers to a digital object or a digital file that includes information interpretable by a computing device (e.g., a client device) to present information to a user. A digital content item can include a file such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents. digital images, digital videos, or digital audio files). In some cases, a digital content item can refer to a remotely stored (e.g., cloud-based) item or a link (e.g., a link to a cloud-based item or a web-based content item) and/or a content clip that indicates (or links) a discrete selection or segmented portion of content from a webpage or some other content item or source. A digital content item can be editable or otherwise modifiable and can also be sharable from one user account (or client device) to another. In some cases, a digital content item is modifiable by multiple user accounts (or client devices) simultaneously and/or at different times.

As used herein, the term "application session" (or sometimes simply "session") refers to an instance of use within a client application. For example, an application session refers to a set of activities performed within a single login of a client application or an application of a content management system. As another example, an application session refers to a set of activities performed within a single visit of an application or a single access of a content item. In some cases, a session requires a login (and thus different logins can separate different sessions) while in other cases, a session does not require a login and instead indicates an instance of use between closures or terminations (of an application or webpage) or between visits that are at least a threshold period of time apart (or separated by a device power off or sleep mode).

Relatedly, the term "web-based application" refers to a computer application that provides and performs functions through a network (e.g., the internet) and that is accessible via a web browser or a mobile application. In some cases, a web-based application is a lighter version of a fully-fledged application (e.g., a desktop version of the application), where the web-based application includes a subset of functions available in a full version of the application. Conversely, the term "desktop application" refers to a computer application installed on a computing device and that includes all available functionality. For example, a desktop backup application can include all functionality for initiating a backup to store content items on the cloud, while a web-based version of the backup application may not include backup functionality but may instead only provide access to view and restore files and file versions.

Additional detail regarding the remote backup system will now be provided with reference to the figures. For example, FIG. 1 illustrates a schematic diagram of an example system environment for implementing a remote backup system 102 in accordance with one or more implementations. An overview of the remote backup system 102 is described in relation to FIG. 1. Thereafter, a more detailed description of the components and processes of the remote backup system 102 is provided in relation to the subsequent figures.

As shown, the environment includes a server(s) 104, client devices 108a-108n, a database 114, and a network 112. Each of the components of the environment can communicate via the network 112, and the network 112 may be any suitable network over which computing devices can communicate. Example networks are discussed in more detail below in relation to FIGS. 13-14.

As just mentioned, the example environment includes client devices 108a-108n. The client devices 108a-108n can be one of a variety of computing devices, including a smartphone, a tablet, a smart television, a desktop computer, a laptop computer, a virtual reality device, an augmented reality device, or another computing device as described in relation to FIGS. 13-14. The client devices 108a-108n can communicate with the server(s) 104 and/or the database 114 via the network 112. For example, the client devices 108a-

108*n* can receive user input from respective users interacting with the client devices 108*a*-108*n* (e.g., via the client application 110) to, for instance, access, generate, create, initiate, monitor, pause, modify a data backup, or to select user interface elements for interacting with the content management system 106. In addition, the remote backup system 102 on the server(s) 104 can receive information relating to various interactions with content items and/or user interface elements based on the input received by the client devices 108*a*-108*n*.

As shown, the client device 108*a* can include a client application 110. In particular, the client application 110 may be a web application, a native application installed on the client device 108*a* (e.g., a mobile application, a desktop application, etc.), or a cloud-based application where all or part of the functionality is performed by the server(s) 104. Based on instructions from the client application 110, the client devices 108*a*-108*n* can present or display information, including a user interface such as a remote backup interface that includes options for generating, managing, and monitoring data backups. For example, the client application 110 can refer to a web-based version of a backup application that includes a subset of functions, not including backup functionality for creating and managing a data backup.

As further shown, the client device 108*n* can include a client application 111. In particular, the client application 110 may be a web application, a native application installed on the client devices 108*a*-108*n* (e.g., a mobile application, a desktop application, etc.), or a cloud-based application where all or part of the functionality is performed by the server(s) 104. Based on instructions from the client application 111, the client devices 108*a*-108*n* can present or display information, including a user interface such as a remote backup interface that includes options for generating, managing, and monitoring data backups. For example, the client application 111 can refer to a desktop version of a backup application that includes all backup functions, including backup functionality for creating and managing a data backup.

As illustrated in FIG. 1, the example environment also includes the server(s) 104. The server(s) 104 may generate, track, store, process, receive, and transmit electronic data, such as digital content items, backup data, interactions with digital content items, and/or interactions between user accounts or client devices. For example, the server(s) 104 may receive data including content items from a client device to back up and store within the database 114. In some cases, the server(s) 104 may receive data from the client devices 108*a*-108*n* in the form of a backup request or to change backup settings. In addition, the server(s) 104 can transmit data to the client devices 108*a*-108*n* in the form of a content item or backup data. Indeed, the server(s) 104 can communicate with the client devices 108*a*-108*n* to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and other types of servers.

As shown in FIG. 1, the server(s) 104 can also include the remote backup system 102 as part of a content management system 106. The content management system 106 can communicate with the client devices 108*a*-108*n* to perform various functions associated with the client application 110 such as managing user accounts, managing backup data, and facilitating user interaction with data backups. Indeed, the content management system 106 can include a network-based smart cloud storage system to manage, store, and maintain content items and related data across numerous user accounts. In some embodiments, the remote backup system 102 and/or the content management system 106 utilize the database 114 to store and access information such as backup data instances, digital content items, and other information.

Although FIG. 1 depicts the remote backup system 102 located on the server(s) 104, in some implementations, the remote backup system 102 may be implemented by (e.g., located entirely or in part on) one or more other components of the environment. For example, the remote backup system 102 may be implemented by the client devices 108*a*-108*n*. For example, the client devices 108*a*-108*n* can download all or part of the remote backup system 102 for implementation independent of, or together with, the server(s) 104.

In some implementations, though not illustrated in FIG. 1, the environment may have a different arrangement of components and/or may have a different number or set of components altogether. For example, the client devices 108*a*-108*n* may communicate directly with the remote backup system 102, bypassing the network 112. As another example, the environment may include multiple client devices, each associated with a different user account for managing digital content items. In addition, the environment can include the database 114 located external to the server(s) 104 (e.g., in communication via the network 112) or located on the server(s) 104 and/or on the client devices 108*a*-108*n*.

Figure 2:
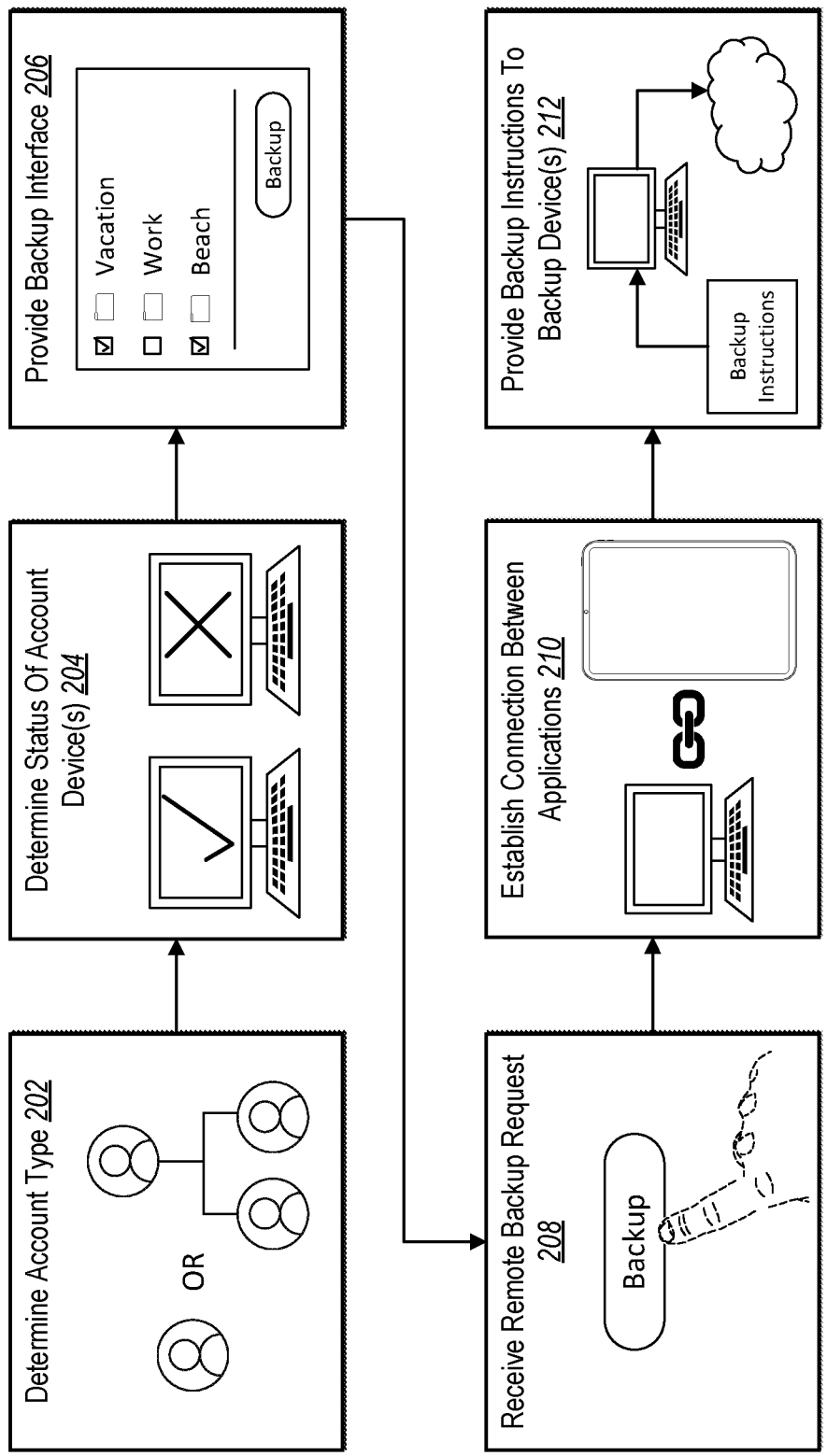
FIG. 2 illustrates an example overview of generating and managing a remote data backup in accordance with one or more embodiments.

As mentioned above, the remote backup system 102 can back up content items stored on one client device based on a backup request from a remote client device. In particular, the remote backup system 102 can receive a backup request from a first client device located remotely from a second client device storing content items for backup, and the remote backup system 102 can provide tools to the first client device for remotely initiating, managing, and monitoring a data backup for the second client device. FIG. 2 illustrates an overview of managing remote backups in accordance with one or more embodiments. Additional detail regarding the various acts illustrated in FIG. 2 is provided thereafter with reference to subsequent figures.

As illustrated in FIG. 2, the remote backup system 102 performs an act 202 to determine an account type. More particularly, the remote backup system 102 determines an account type associated with a user account within the content management system 106. For example, the remote backup system 102 receives an indication that a user account is logged in via a client device (e.g., the client device 108*a* or the client device 108*n*), and the remote backup system 102 determines an account type for the user account. In some cases, the remote backup system 102 determines that the account type for the user account is an administrator account, a (non-administrator) team member account, or an individual user account.

As further illustrated in FIG. 2, the remote backup system 102 performs an act 204 to determine a status of one or more account device(s). To elaborate, the remote backup system 102 determines or identifies client devices associated with a user account. For instance, the remote backup system 102 determines that a user account is associated with (e.g., has registered as part of the account and/or has previously logged in using) three different client devices, including a personal computer ("PC"), an Apple® Macintosh® computer ("Mac"), and a mobile device (e.g., a smartphone or a tablet). The remote backup system 102 further determines a connection status for each client device and/or for backup applications installed on the client devices. The remote backup system 102 thus determines whether the client devices and/or their backup applications are accessible via a network (e.g., the network 112) for transmitting and receiving backup instructions. In some cases, the remote backup system 102 likewise determines connection statuses for different client devices associated with different team accounts.

Additionally, the remote backup system 102 performs an act 206 to provide a backup interface. In particular, the remote backup system 102 generates and provides a backup interface for display on a client device based on the statuses of client devices associated with a user account and/or an account type of the user account. For example, in response to determining that a client device and its backup application are online and accessible, the remote backup system 102 provides a backup interface that includes synchronous backup elements for backing up content items in (immediate) response to a backup request. As another example, in response to determining that a client device and/or its backup application are offline or inaccessible, the remote backup system 102 provides a backup interface that includes asynchronous backup elements for scheduling a data backup for content items on the client device. As a further example, in response to determining that a user account is an administrator user account for a team of user accounts within the content management system 106, the remote backup system 102 provides a backup interface that includes team backup elements for backing up content items stored at client devices associated with team accounts.

As further illustrated in FIG. 2, the remote backup system 102 performs an act 208 to receive a remote backup request. More specifically, the remote backup system 102 receives an indication of user interaction selecting a backup element from a client device different from (and located remotely from) a client device to be backed up. For example, the remote backup system 102 receives a backup request from a remote client device running or operating a web-based version of a backup application. In some cases, the remote backup system 102 receives the remote backup request via a web browser interaction or an interaction within a mobile application that does not include full backup functionality (e.g., where the application is missing functions for creating, initiating, pausing, resuming, and monitoring progress of data backups).

In addition, the remote backup system 102 performs an act 210 to establish a connection between applications. In particular, the remote backup system 102 establishes a connection between a remote client device requesting a backup and one or more other client devices storing content items to be backed up. For instance, the remote backup system 102 connects a web-based application at the remote device with a desktop application at the backup device such that the web-based application can tap into and leverage the backup functionality of the desktop application (e.g., through web sockets and/or long polling). In cases where the remote backup system 102 determines that a backup device is offline and/or its desktop backup application is unavailable, the remote backup system 102 determines that no immediate connection is available and establishes a connection according to asynchronous backup settings set via a remote backup interface (e.g., upon soonest availability or according to a schedule).

As further illustrated in FIG. 2, the remote backup system 102 performs an act 212 to provide backup instructions to one or more backup device(s). More specifically, the remote backup system 102 generates and provides backup instructions based on a backup request received from a remote device, where the backup instructions include computer code that cause or instigate execution of backup functions at a backup device. For example, the remote backup system 102 provides a backup instruction to a backup device to cause a desktop backup application running at the backup device to back up one or more content items to an account-specific cloud storage location within the content management system 106. In some cases, the remote backup system 102 provides a backup instruction to an online device with an accessible desktop application immediately in response to receiving a backup request (e.g., without waiting for a schedule or a next availability). In other cases, the remote backup system 102 provides a backup instruction to an offline device (and/or an inaccessible desktop application) upon its next online status (and/or soonest accessibility of the desktop application).

Figure 3:
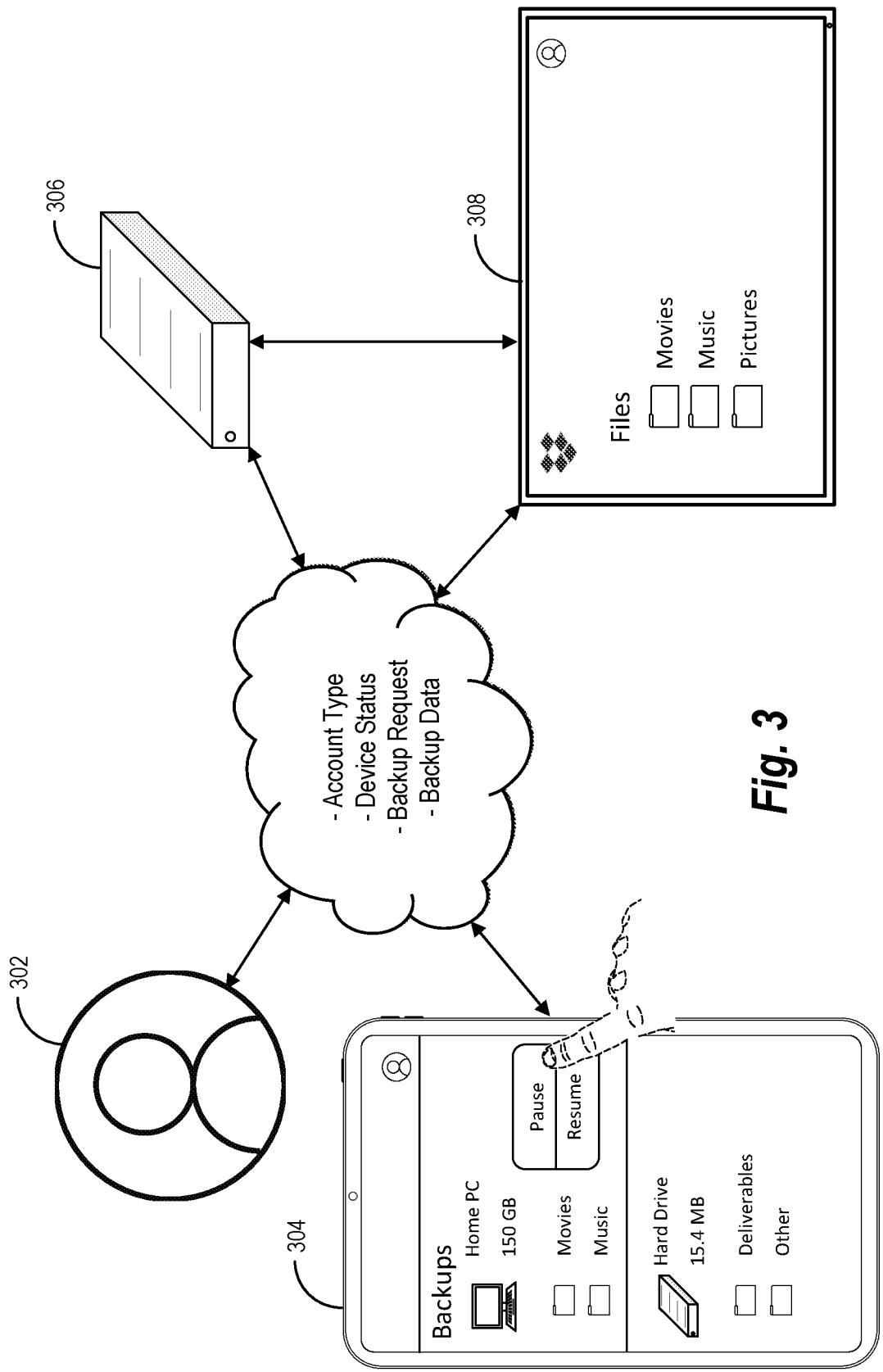
FIG. 3 illustrates an example diagram for facilitating remote data backups across devices in accordance with one or more embodiments.

As mentioned above, in certain described embodiments, the remote backup system 102 performs remote backups via a remote client device. In particular, the remote backup system 102 establishes a connection between a remote client device requesting a backup and a backup device performing the backup, where the connection enables the remote device to access and manage backup functions installed on the backup device (e.g., as part of a desktop backup application). FIG. 3 illustrates an example diagram for establishing connections and performing remote backups in accordance with one or more embodiments.

As illustrated in FIG. 3, the remote backup system 102 identifies or determines an account type of a user account 302 accessing a web-based backup application via a client device 304 (e.g., a remote client device located in a different physical location from backup devices). For example, the remote backup system 102 determines that the user account 302 is an individual user account within the content management system 106. Accordingly, the remote backup system 102 generates and provides a remote backup interface for display on the client device 304 that includes individual-account-specific backup elements (omitting team-specific backup elements).

In addition, the remote backup system 102 identifies, detects, or determines a device status associated with one or more backup devices, such as the backup device 306 and the backup device 308. For instance, the remote backup system 102 determines that the backup device 306 is a USB storage drive attached to the backup device 308 (e.g., physically connected to or otherwise managed, housed, and/or maintained by the backup device 308). In addition, the remote backup system 102 determines whether the backup device 306 and/or the backup device 308 is accessible for performing a data backup. For example, the remote backup system 102 determines whether the backup device 306 and/or the backup device 308 are online or offline.

In one or more embodiments, the remote backup system 102 also determines whether a desktop backup application is installed on and/or accessible via the backup device 308. For example, the remote backup system 102 analyzes a desktop backup application on the backup device 308 to determine that the same user account 302 is logged in with permissions to perform data backups. In addition, the remote backup system 102 determines that the desktop backup application on the backup device 308 includes, and has not disabled, backup functionality for performing data backups (including approval for performing remote backups). In some cases, the remote backup system 102 determines the same accessibility status for the backup device 306 as the backup device 308

(as the backup device 306 is controlled by the backup device 308), where the desktop backup application at the backup device 308 controls backups for the backup device 306 as well. In certain cases, the remote backup system 102 may detect that the backup device 308 (e.g., via the desktop backup application) has applied certain settings to restrict, prevent, or selectively limit backing up content items stored on the backup device 306 (e.g., by limiting which content items can be remotely backed up and/or when remote backups can occur).

As further illustrated in FIG. 3, the remote backup system 102 receives a backup request from the client device 304. As shown, the remote backup system 102 provides a remote backup interface for display on the client device 304, and the remote backup system 102 receives a backup request by way of a user interaction within the remote backup interface. In particular, the remote backup system 102 receives a backup request to back up one or more content items stored on the backup device 306 ("Home PC") and/or the backup device 308 ("Hard Drive"). For example, the remote backup system 102 receives a user interaction selecting certain content items and initiating a data backup from the client device 304.

In response to receiving a backup request, the remote backup system 102 relays the backup request to the backup device 308 and/or generates a backup instruction to provide to the backup device 308. In certain embodiments, the remote backup system 102 generates a backup instruction that includes computer code for performing a backup operation at the backup device 308 using a backup application installed on the backup device 308. In some cases, the remote backup system 102 generates a backup instruction that includes computer code for backing up the backup device 306 using the backup application installed on the backup device 308 that controls the backup device 306.

In response to providing the backup instruction to the backup device 308 (e.g., for backing up the backup device 308 and/or the backup device 306), the remote backup system 102 receives backup data. Specifically, the remote backup system 102 receives backup data in the form of content items to back up from the backup device 308 and/or the backup device 306 for storage within a backup instance associated with the user account 302 within the content management system 106. Indeed, the remote backup system 102 can manage different backup instances for the backup device 308 and the backup device 306 remotely based on instructions from the client device 304.

Figure 4:
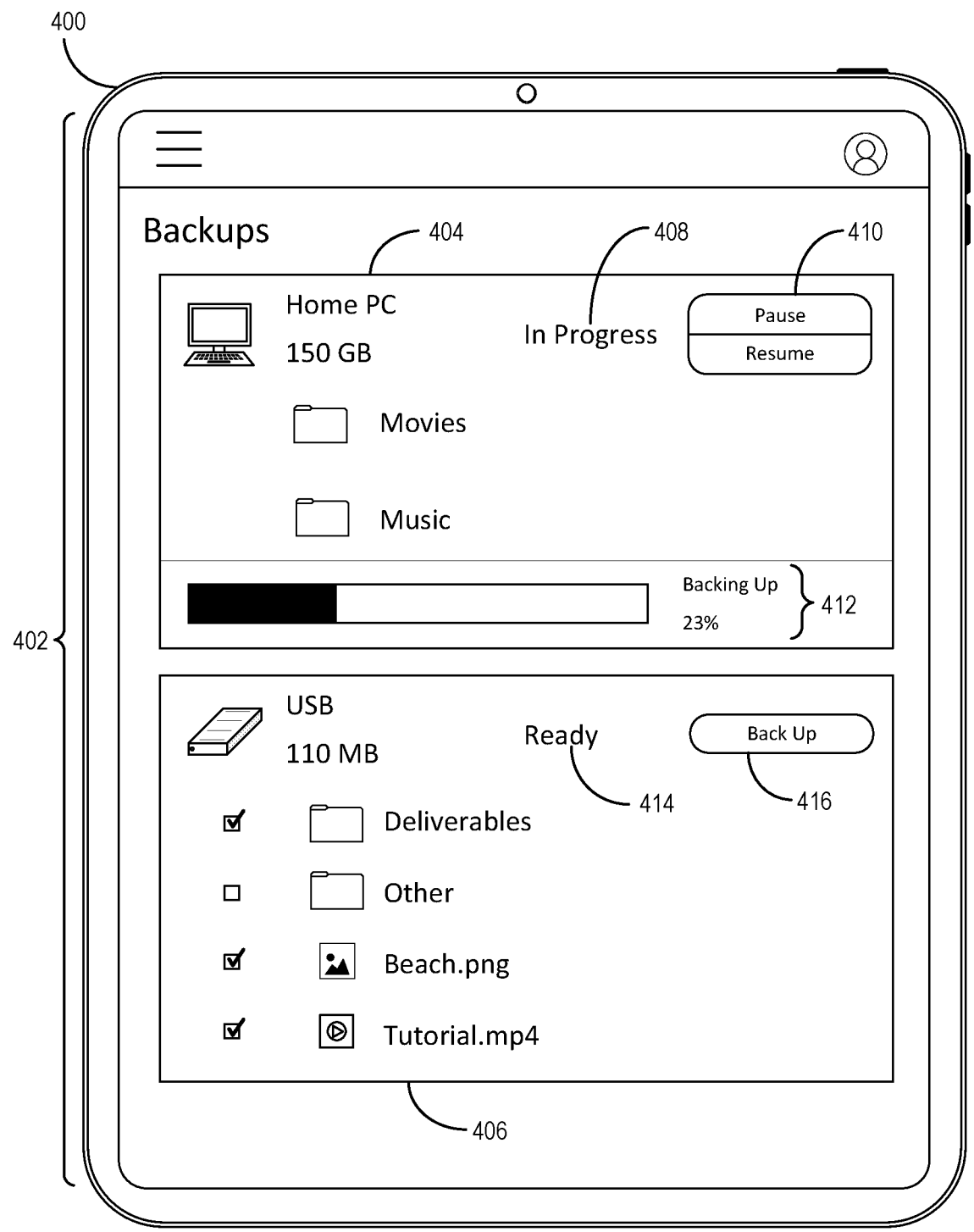
FIG. 4 illustrates an example remote backup interface for synchronous backups in accordance with one or more embodiments.

As mentioned above, in certain described embodiments, the remote backup system 102 generates and provides a remote backup interface for display on a client device. In particular, the remote backup system 102 provides a remote backup interface that includes backup elements according to a type of user account accessing the remote backup interface and/or a status of one or more backup devices and/or desktop backup applications installed on the backup devices. FIG. 4 illustrates an example remote backup interface in accordance with one or more embodiments.

As illustrated in FIG. 4, the client device 400 (e.g., the client device 108a) displays a remote backup interface 402 (e.g., as part of the client application 110) that includes a backup window 404 and a backup window 406 that are specific to different backup devices (e.g., the backup device 308 and the backup device 306). Within the backup window 404, the remote backup system 102 provides a status indicator 408 indicating a backup status for a backup device, "Home PC," along with a backup size for the content items to be backed up (150 GB) and a scrollable list of content items and folders for backing up.

As shown, the status indicator 408 indicates that a backup is in progress ("In Progress"). Indeed, by establishing a connection between the web-based application on the client device 400 (that includes the remote backup interface 402), the remote backup system 102 can access backup status information for real-time (or near real-time) monitoring and managing of a data backup through leveraging backup functions of a desktop backup application (e.g., the client application 111) at the backup device (e.g., "Home PC"). Accordingly, the remote backup system 102 also generates and provides a progress indicator 412 for a data backup that is in progress, including a progress bar and a percentage indication ("23%"). To generate the progress indicator 412, in some cases, the remote backup system 102 generates and relays progress query instructions (including computer code for a desktop application) to provide to the desktop application of the Home PC, whereupon the desktop application at the Home PC generates progress data to relay back to the web-based application at the client device 400.

The remote backup system 102 further generates and provides a backup control element 410 for display within the backup window 404. Indeed, the backup control element 410 is selectable to control a data backup for the Home PC by pausing and/or resuming the data backup. Based on receiving a user interaction selecting the pause option within the backup control element 410, the remote backup system 102 receives a pause request from the web-based application on the client device 400, generates a pause instruction including computer code for instructing (and specific to) the desktop backup application connected to the web-based application to pause the backup, and provides the pause instruction to the desktop backup application at the Home PC device. Similarly, based on receiving a user interaction selecting the resume option within the backup control element 410, the remote backup system 102 receives a resume request from the web-based application on the client device 400, generates a resume instruction including computer code for instructing (and specific to) the desktop backup application connected to the web-based application to resume the backup, and provides the resume instruction to the desktop backup application at the Home PC device.

As further illustrated in FIG. 4, the backup window 406 includes a status indicator 414 that reflects the status of the backup device ("USB") and/or a desktop backup application controlling backups for the backup device (e.g., at the Home PC which manages the USB drive). As shown, the status of the USB drive is "Ready," meaning that the remote backup system 102 determines that the USB drive is online and operating and that the desktop application associated with the USB drive (e.g., installed on the Home PC) is accessible. Based on determining that the USB drive is ready, the remote backup system 102 generates and provides a synchronous backup element 416 selectable for initiating a data backup (immediately) in response to the selection. As shown, the remote backup system 102 further enables selection of various content items and folders stored on the USB drive to include as part of a data backup (e.g., via checking the boxes shown in the backup window 406).

Figure 5:
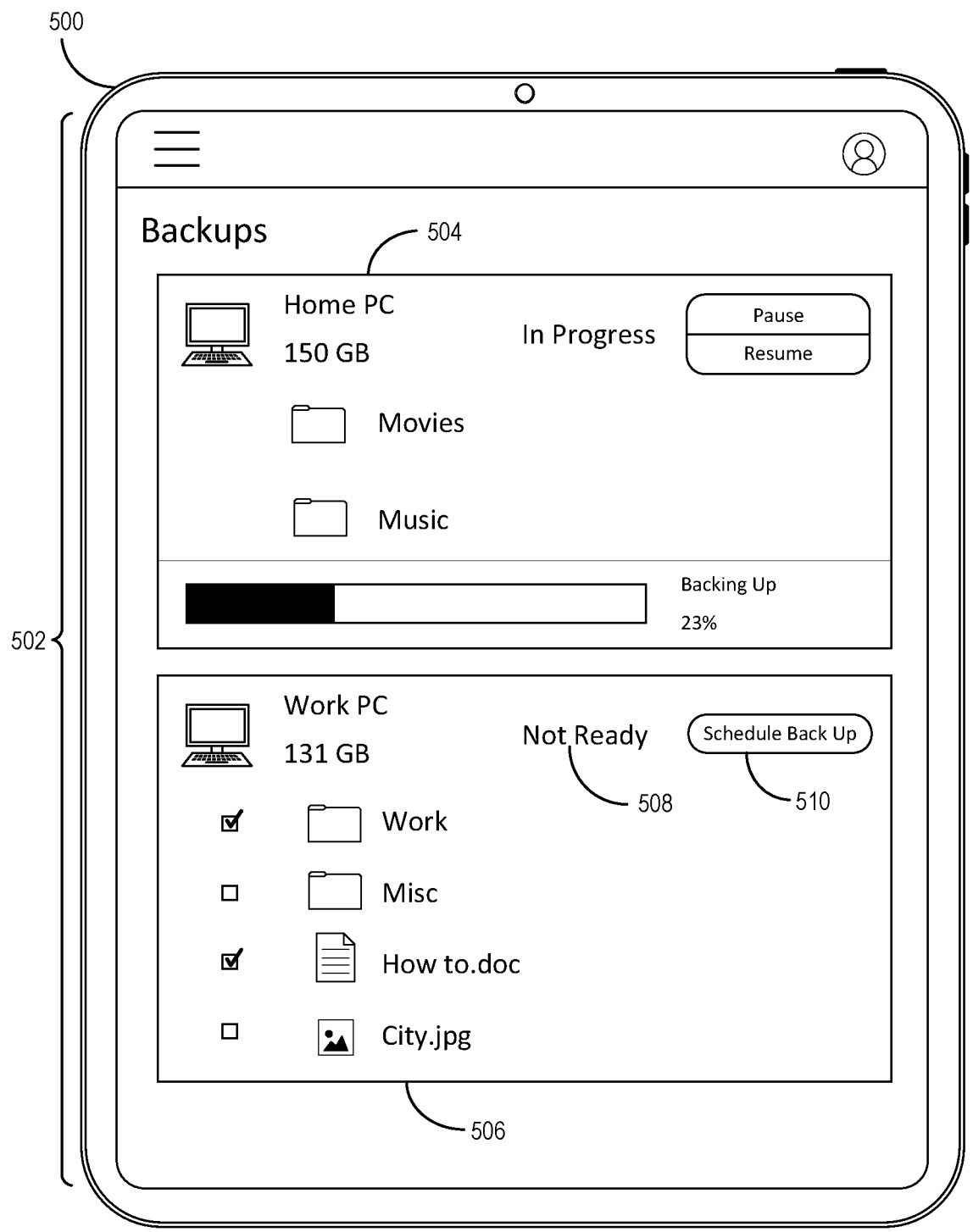
FIG. 5 illustrates an example remote backup interface for asynchronous backups in accordance with one or more embodiments.

As mentioned above, in certain embodiments, the remote backup system 102 generates and provides a remote backup interface that includes asynchronous backup elements. In particular, based on determining that a backup device and/or a desktop backup application at a backup device is offline or otherwise inaccessible, the remote backup system 102 provides asynchronous backup elements for scheduling a data backup. FIG. 5 illustrates an example remote backup interface including asynchronous backup elements in accordance with one or more embodiments.

As illustrated in FIG. 5, the client device 500 (e.g., the client device 108a) presents or displays a remote backup interface 502 (e.g., as part of the client application 110) that includes a backup window 504 and a backup window 506. As shown, the backup window 504 includes status indicators and elements in line with the discussion above for the backup window 404 in FIG. 4. In addition, the backup window 406 includes a status indicator 508 ("Not Ready") that indicates that a backup device and/or a desktop backup application (e.g., the client application 111) corresponding to the backup window 506 is inaccessible or otherwise incapable of performing a backup currently. For instance, the remote backup system 102 determines that the Work PC is offline and/or that the desktop backup application on the Work PC is not installed, offline, is blocking remote backups (e.g., via application settings or permissions) or is otherwise inaccessible.

Based on determining that the Work PC is offline and/or that its desktop backup application is inaccessible, in some embodiments, the remote backup system 102 generates and provides an asynchronous backup element 510 within the backup window 506. To elaborate, the remote backup system 102 provides the asynchronous backup element 510 that is selectable to schedule or set up a data backup for the offline/inaccessible Work PC. Within the backup window 506, the remote backup system 102 further provides selectable elements for indicating which folders or content items stored on the Work PC to include as part of a backup. The remote backup system 102 can further indicate a total backup size for the Work PC based on the selected folders and content items ("131 GB").

Figure 6:
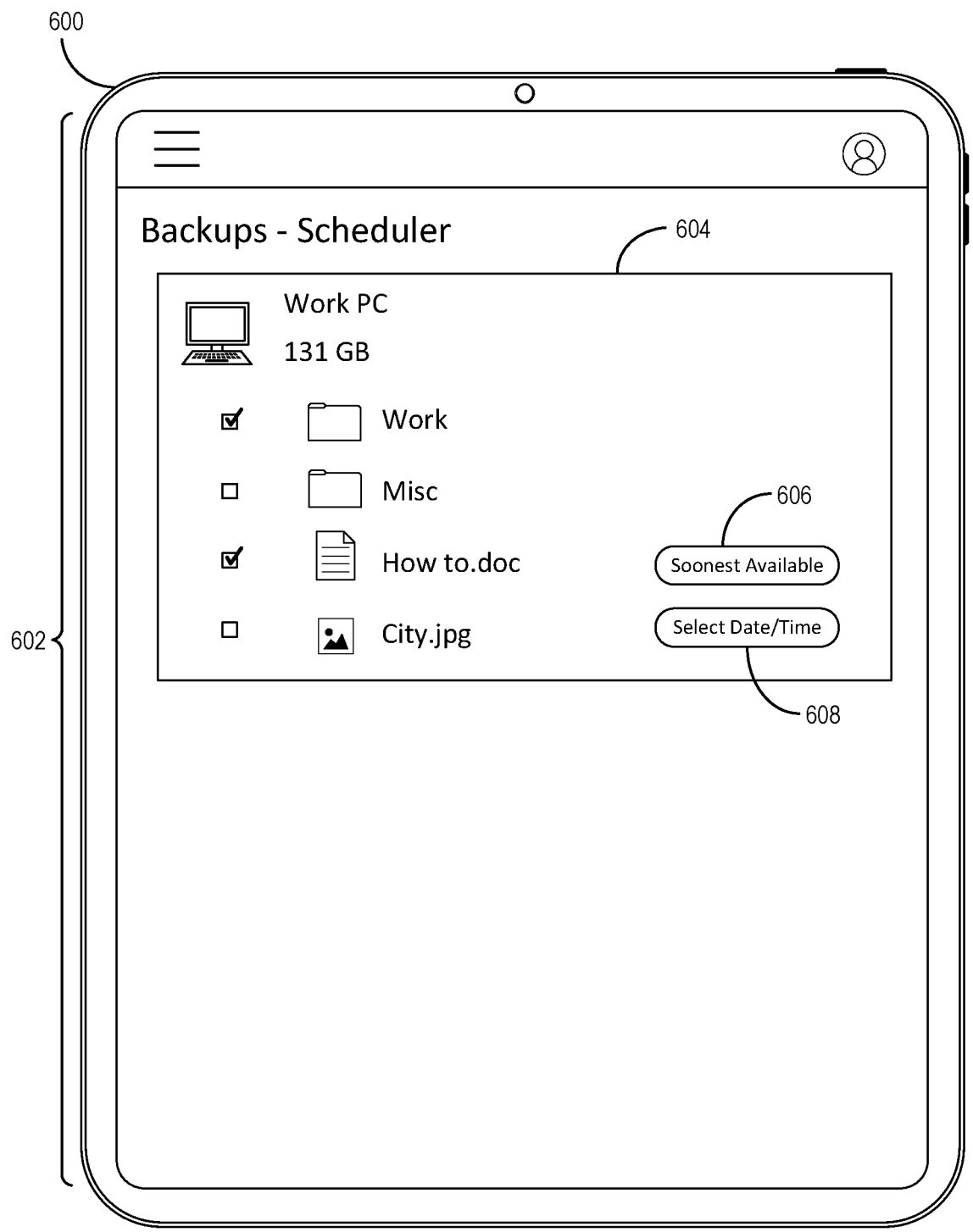
FIG. 6 illustrates an example backup scheduling interface in accordance with one or more embodiments.

As mentioned above, in response to receiving an indication of a user interaction selecting the asynchronous backup element 510, the remote backup system 102 can provide options for scheduling an asynchronous data backup. In particular, the remote backup system 102 can generate and provide a backup scheduling interface for setting up an asynchronous backup for an offline/inaccessible backup device (e.g., the Work PC). FIG. 6 illustrates an example asynchronous backup scheduling interface in accordance with one or more embodiments.

As illustrated in FIG. 6, the client device 600 (e.g., the client device 108a) presents or displays an asynchronous backup scheduling interface 602 (e.g., as part of the client application 110) that includes a scheduling window 604. Within the scheduling window 604, the remote backup system 102 provides a first scheduling element 606 and a second scheduling element 608. Indeed, based on detecting a user interaction selecting an asynchronous backup element, the remote backup system 102 provides the asynchronous backup scheduling interface 602 for scheduling a data backup at the soonest available time (e.g., based on selection of the first scheduling element 606) or at a specific date and time (e.g., based on selection of the second scheduling element 608).

Indeed, based on receiving an indication of a user interaction selecting the first scheduling element 606, the remote backup system 102 generates a backup instruction that includes computer code to trigger a data backup upon detecting that the Work PC is online and/or that the desktop backup application is operating and accessible. Thus, in response to detecting a status change for the Work PC to indicate that the Work PC is accessible, the remote backup system 102 initiates a data backup using the desktop backup application on the Work PC based on the remote backup request in the form of the selection of the first scheduling element 606.

Based on an interaction with the second scheduling element 608, on the other hand, the remote backup system 102 generates and provides a backup scheduler that includes selectable elements for setting a date and/or a time for performing a data backup. Accordingly, the remote backup system 102 generates a backup instruction that includes computer code that triggers a backup at the designated date and time. In some cases, the remote backup system 102 generates a backup instruction that includes computer code that triggers a backup at the soonest available time after the scheduled date and time that the Work PC is online and accessible (e.g., in cases where the Work PC is inaccessible at the exact scheduled time).

Figure 7:
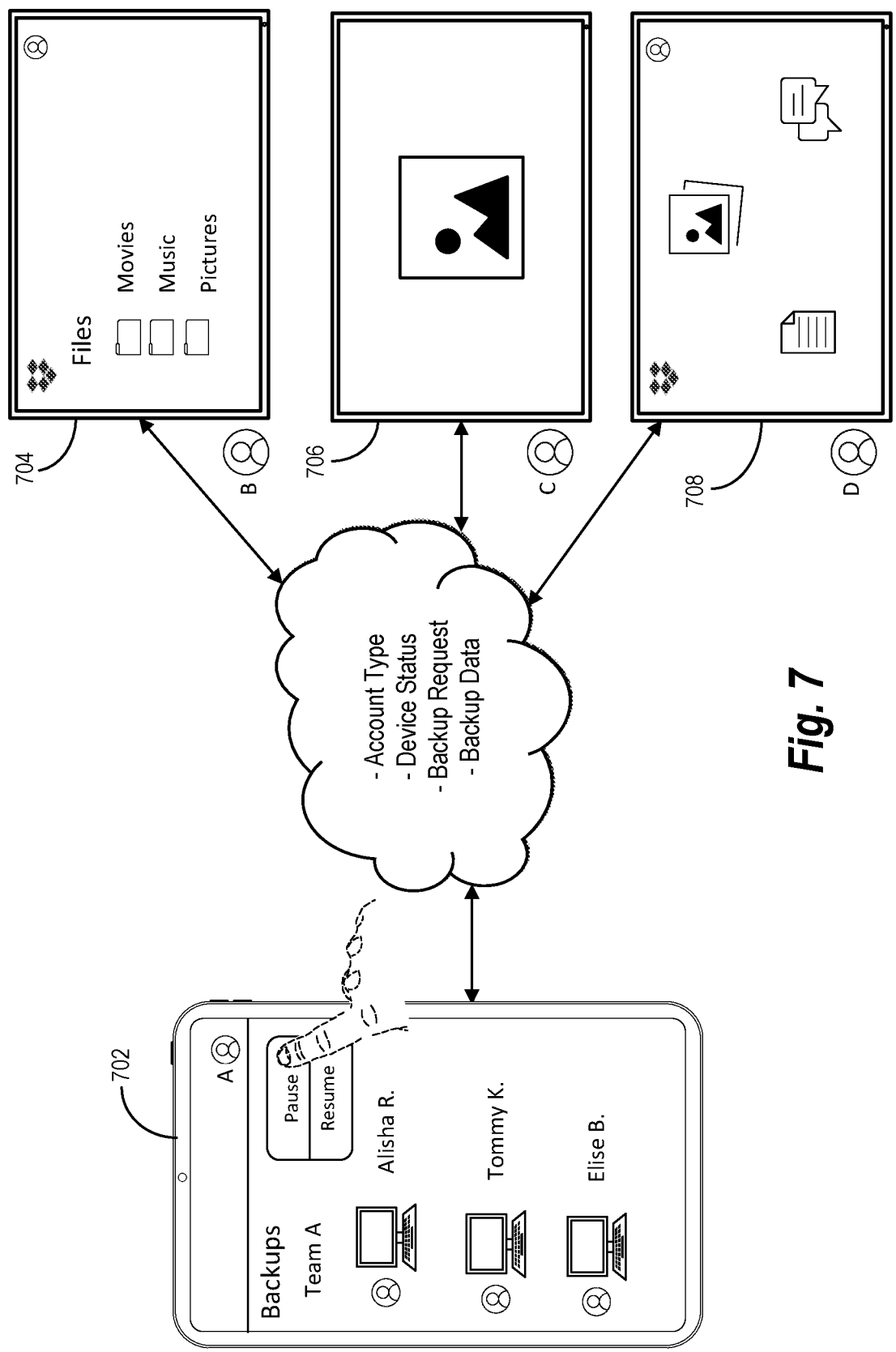
FIG. 7 illustrates an example diagram for facilitating remote team backups across devices in accordance with one or more embodiments.

As mentioned above, in certain described embodiments, the remote backup system 102 facilitates remote team backups. In particular, the remote backup system 102 enables a team administrator account to schedule, manage, and monitor data backups across backup devices associated with user accounts that are part of a team within the content management system 106. FIG. 7 illustrates an example diagram for creating, managing, and monitoring remote team backups in accordance with one or more embodiments.

As illustrated in FIG. 7, the remote backup system 102 identifies or determines an account type for a user account (e.g., user account A logged into the client device 702). In particular, the remote backup system 102 determines that user account A is an administrator account with administrative privileges over a team of user accounts, including user account B, user account C, and user account D. Based on determining that the user accounts A-D are part of a team within the content management system 106, and further based on determining that user account A is an administrator account, the remote backup system 102 generates and provides a team backup interface for display on the client device 702 (e.g., the client device 108a). As shown, the team backup interface includes team backup elements for managing team-account-specific backups for client devices associated with team accounts.

As further illustrated in FIG. 7, the remote backup system 102 determines a device status for a number of backup devices. More particularly, the remote backup system 102 determines a device status for the backup device 704 associated with the user account B. For example, the remote backup system 102 determines the device status by determining that the backup device 704 is online and that the backup device 704 is running a desktop backup application that is online and accessible by the client device 702 (e.g., via the network 112). The remote backup system 102 further determines a device status for the backup device 706 associated with the user account C the backup device 708 associated with the user account D. In some cases, the remote backup system 102 determines that some team backup devices (and/or their desktop backup applications) are online/accessible and that other team backup devices (and/or their desktop backup applications) are offline/inaccessible.

Based on the device statuses associated with the backup device 704, the backup device 706, and the backup device 708, the remote backup system 102 provides corresponding backup elements within the team backup interface on the client device 702. For example, the remote backup system 102 provides synchronous team backup elements for backing up content items stored at online/accessible team backup devices. In addition, the remote backup system 102 provides asynchronous backup elements for backing up content items stored at offline/inaccessible team backup devices.

Indeed, the remote backup system 102 can facilitate team backups across multiple team devices in response to user interactions with backup elements at the single remote client device 702. For instance, the remote backup system 102 receives a team backup request from the client device 702 for backing up content items from the backup device 704 (e.g., based on a selection of a team backup element). In response to the team backup request, the remote backup system 102 generates a team backup instruction that includes computer code for instructing a desktop backup application on the backup device 704 to back up team content items. The remote backup system 102 further provides the team backup instruction to the backup device 704, whereupon the backup device 704 transmits backup data (e.g., content items) to a team backup instance within the content management system 106. The remote backup system 102 can likewise receive team backup requests, generate team backup instructions, and provide team backup instructions for the backup device 706 and the backup device 708 (e.g., for synchronous or asynchronous backups).

Figure 8:
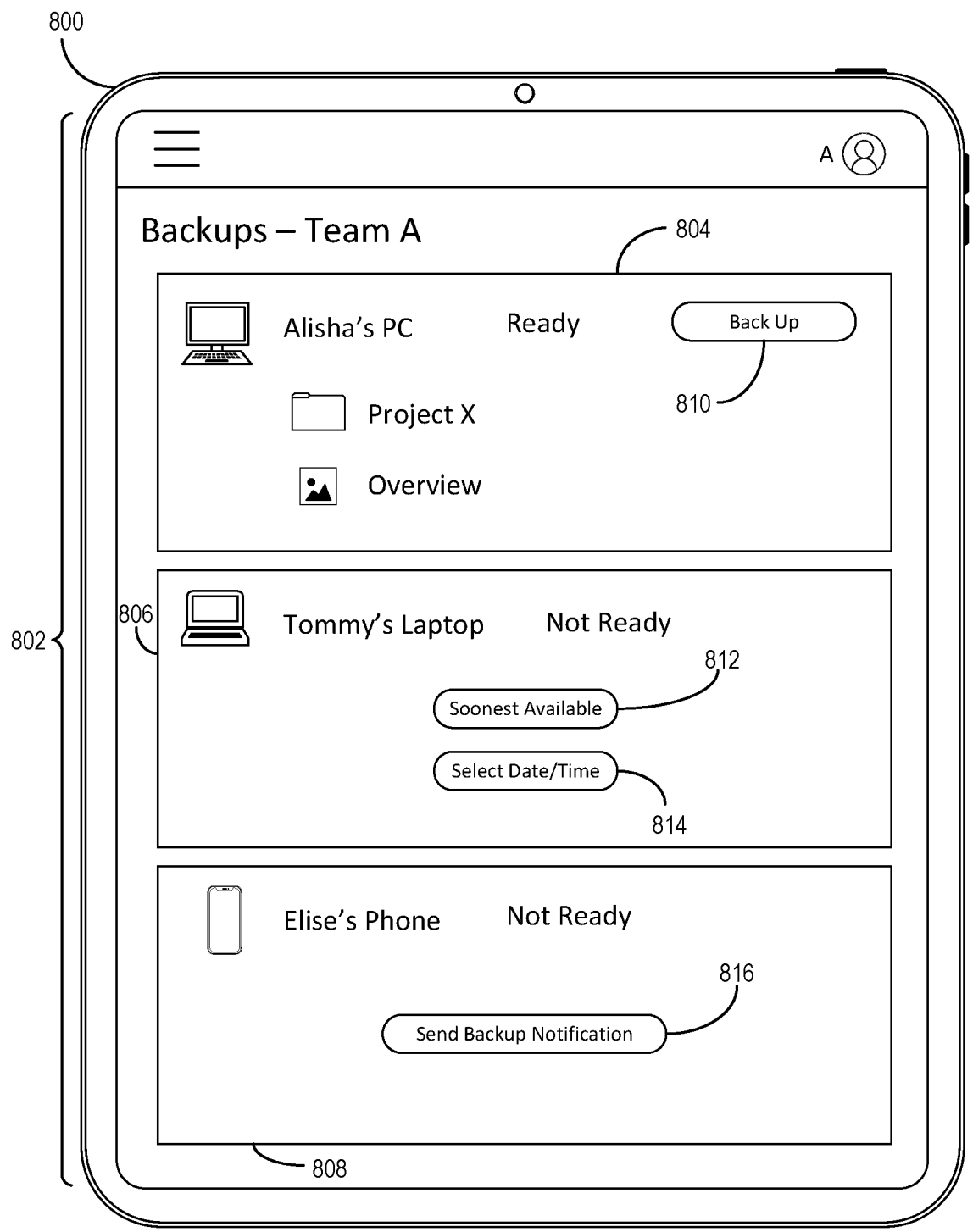
FIG. 8 illustrates an example remote backup interface for team backups in accordance with one or more embodiments.

As mentioned above, in certain described embodiments, the remote backup system 102 provides a remote backup interface that includes team backup elements for display on a client device associated with an administrator account. In particular, the remote backup system 102 generates and provides synchronous team backup elements and asynchronous team backup elements in relation to different team accounts presented within a single remote backup interface. FIG. 8 illustrates a remote backup interface including team backup elements in accordance with one or more embodiments.

As illustrated in FIG. 8, the client device 800 (e.g., the client device 108a) presents or displays a remote backup interface 802 (e.g., as part of the client application 110) that includes team backup elements. In particular, the remote backup system 102 determines that user account A logged in to the client device 800 is an administrator account with team backup privileges, and the remote backup system 102 further determines device statuses associated with team devices for team accounts within user account A's team. Based on the user account A account type and the team device statuses, the remote backup system 102 generates the remote backup interface 802 to include a backup window 804 for a first team device, a backup window 806 for a second team device, and a backup window 808 for a third team device.

As just mentioned, the remote backup system 102 generates the backup window 804 for performing backups for Alisha's PC (e.g., where Alisha is user account B from FIG. 7). To elaborate, the remote backup system 102 determines that Alisha is a team member of user account A's team within the content management system 106. In addition, the remote backup system 102 determines that Alisha's PC is online and/or that a desktop backup application (e.g., the client application 111) installed on Alisha's PC is running and/or otherwise available to execute backup operations. Accordingly, the remote backup system 102 generates the backup window 804 to include a synchronous backup element 810 that is selectable to generate a backup request for backing up content items from Alisha's PC (e.g., in immediate response to the backup request). In some cases, the remote backup system 102 further generates the backup window 804 to include selectable options to indicate which content items stored on Alisha's PC to back up. In some embodiments, the remote backup system 102 only accesses content items (e.g., "Project X" and "Overview") on Alisha's PC that are within certain storage locations or domains associated with the team of user accounts and/or that are otherwise permissible.

As mentioned, the remote backup system 102 receives a backup request from the client device 800 based on (or in the form of) the indication of a user interaction selecting the synchronous backup element 810. In response to the selection, the remote backup system 102 generates a backup instruction that includes computer code interpretable by the desktop application on the backup device (e.g., Alisha's PC) for instructing the backup device to back up selected content items to a team backup instance within the content management system 106. The remote backup system 102 further provides the backup instruction to the backup device and receives the designated content items as backup data for storage within the content management system 106.

As further illustrated in FIG. 8, the remote backup system 102 generates and provides a backup window 806. More specifically, the remote backup system 102 generates the backup window 806 for a backup device associated with a different team account (e.g., Tommy's Laptop). To provide the backup window 806, the remote backup system 102 determines that Tommy (e.g., user account C from FIG. 7) is a user account within a team of user accounts associated with user account A. In addition, the remote backup system 102 determines that Tommy's Laptop is offline and/or that the desktop backup application installed on Tommy's Laptop is inaccessible for performing backup functions. Accordingly, the remote backup system 102 generates and provides asynchronous backup element 812 and asynchronous backup element 814 for display within the backup window 806.

Based on receiving an asynchronous backup request from the client device 800 (e.g., in response to a user interaction selecting the asynchronous backup element 812), the remote backup system 102 generates a corresponding backup instruction. Specifically, the remote backup system 102 generates an asynchronous backup instruction that includes computer code interpretable by the desktop backup application on the backup device (e.g., Tommy's Laptop) for performing a team backup of selected content items. The remote backup system 102 can hold or store the backup instruction until detecting that the backup device is online and/or that its desktop backup application is accessible for executing backup instructions, whereupon the remote backup system 102 executes backup functions via the desktop backup application to back up selected content items from the backup device to a team backup instance.

Based on receiving an indication of a user interaction selecting the asynchronous backup element 814, the remote backup system 102 generates an asynchronous backup instruction including computer code indicating a specific date and time for backing up content items via the backup application on Tommy's Laptop. The remote backup system 102 thus stores or maintains the backup instruction to provide to Tommy's Laptop upon detecting that the designated date and time are satisfied (and based on detecting that Tommy's Laptops and/or its backup application is online and accessible). In some cases, the remote backup system 102 provides the backup instruction to Tommy's Laptop which stores or maintains the backup instruction until the date and time are satisfied for executing the data backup.

As further illustrated in FIG. 8, the remote backup system 102 generates and provides the backup window 808. In particular, the remote backup system 102 generates the backup window 808 based on determining that Elise (e.g., user account D from FIG. 7) is a team account within a team associated with user account A. The remote backup system 102 further generates the backup window 808 based on determining that the user account for Elise has not registered a backup device that includes a desktop backup application and/or that a desktop backup application is not installed on a backup device. Accordingly, the remote backup system 102 generates the backup window 808 to include an indirect backup element 816 selectable to generate and provide a notification to the client device (e.g., Elise's Phone) to prompt the user account to perform a backup. Indeed, because the remote backup system 102 cannot access a backup device that includes a desktop backup application for Elise's user account, the remote backup system 102 provides the indirect backup element 816 to prompt the user account to independently perform a backup. Upon detecting registration of a backup device with the appropriate backup application for performing backup functions for Elise's user account, the remote backup system 102 can update the backup window 808 to include synchronous and/or asynchronous backup elements as described.

Figure 9:
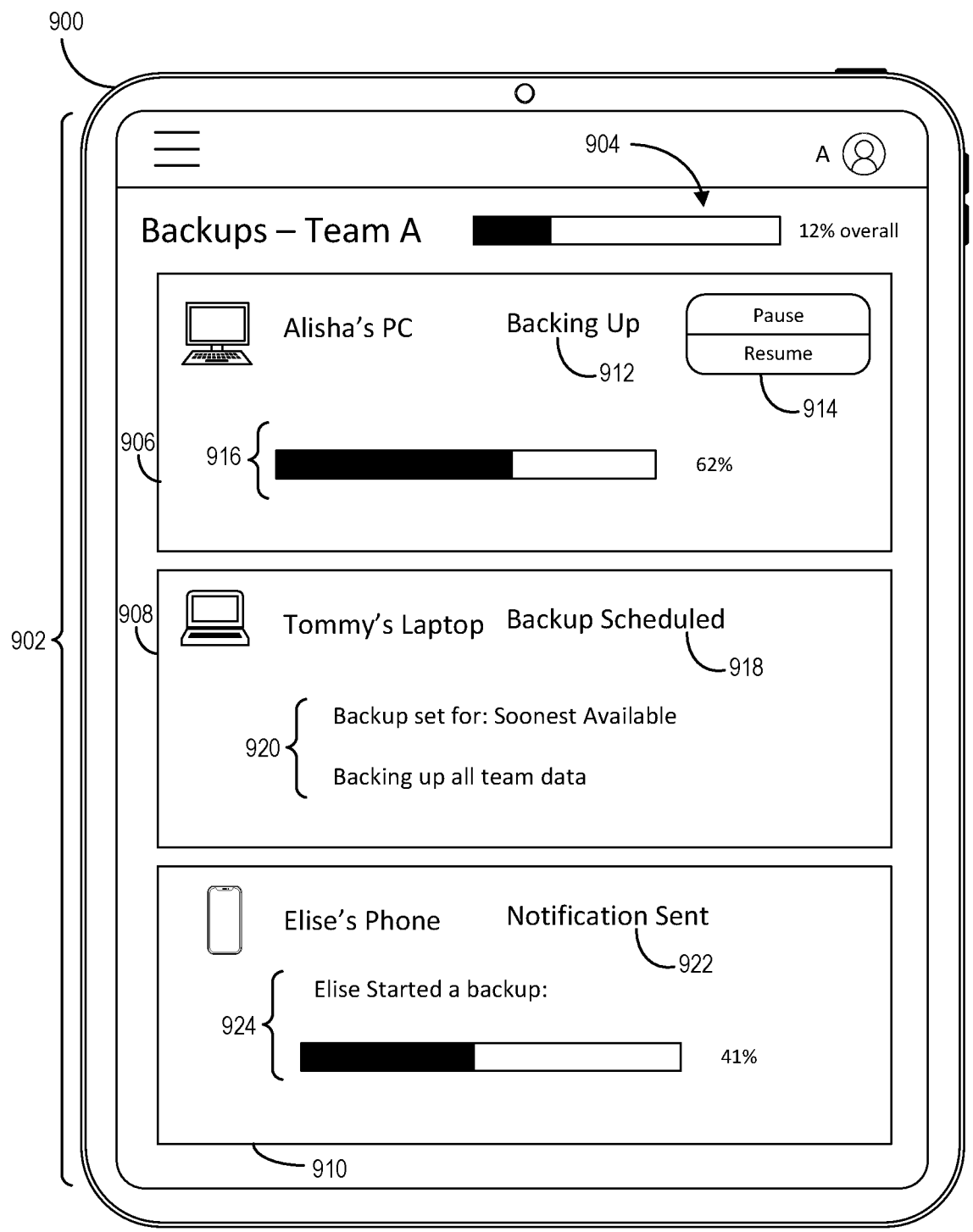
FIG. 9 illustrates an example remote backup interface for monitoring team backups in accordance with one or more embodiments.

As mentioned above, in certain described embodiments, the remote backup system 102 facilitates managing and monitoring data backups for team devices via a remote client device. In particular, the remote backup system 102 provides a remote backup interface that includes backup managing and monitoring elements specific to different team devices. FIG. 9 illustrates an example remote backup interface for managing and monitoring team backups in accordance with one or more embodiments.

As illustrated in FIG. 9, the client device 900 (e.g., the client device 108a) presents or displays a remote backup interface 902 (e.g., as part of the client application 110) that includes a backup window 906, a backup window 908, and a backup window 910. For instance, the backup window 906 corresponds to the backup window 804 while the backup window 908 corresponds to the backup window 806, and the backup window 910 corresponds to the backup window 808. As shown, the remote backup system 102 further generates and provides an overall backup progress indicator 904 for display within the remote backup interface 902. Specifically, the remote backup system 102 generates a progress query instruction to provide to each of the team devices and further receives progress indicators for each respective device. The remote backup system 102 can further determine an overall progress of the team backup based on the individual progress of the devices, and the remote backup system 102 can indicate the progress via the overall backup progress indicator 904.

As further illustrated in FIG. 9, the remote backup system 102 generates and provides the backup window 906. In particular, the remote backup system 102 provides the backup window 906 to manage and monitor a team backup for Alisha's PC. As shown, the remote backup system 102 generates a status indicator 912 that indicates that Alisha's PC is currently performing a backup. The remote backup system 102 further generates and provides a progress indicator 916 that indicates how far along the data backup is for Alisha's PC. Indeed, based on providing a backup instruction to Alisha's PC, the remote backup system 102 maintains a connection between Alisha's PC and the client device 900 (e.g., via the desktop backup application on Alisha's PC and a web-based application on the client device 900) to determine backup status and/or backup progress. In some cases, the remote backup system 102 periodically generates status instructions and/or progress instructions to query the status and/or progress of the data backup, whereupon the remote backup system 102 receives corresponding status/progress indicators.

As further shown, the remote backup system 102 generates and provides a backup control element 914 for display within the backup window 906. To elaborate, the remote backup system 102 establishes and maintains a connection between the web-based application on the client device 900 and the desktop backup application on Alisha's PC such that the remote backup system 102 facilitates remote management of the data backup from the client device 900. Indeed, based on receiving an indication of a user interaction with the backup control element 914 to pause the data backup, the remote backup system 102 generates a pause instruction that includes computer code indicating that the team administrator account is pausing the team backup on Alisha's PC. The remote backup system 102 further provides the pause instruction to Alisha's PC whereupon Alisha's PC pauses the data backup. Similarly, based on receiving an indication of a user interaction selecting the backup control element 914 to resume the data backup, the remote backup system 102 generates and provides a resume instruction including computer code interpretable by the desktop backup application on Alisha's PC to indicate that the team administrator account is resuming the data backup.

As further illustrated in FIG. 9, the remote backup system 102 generates and provides the backup window 908. In particular, the remote backup system 102 generates the backup window 908 to monitor and manage the data backup for Tommy's Laptop. For example, in response to an asynchronous backup request, the remote backup system 102 generates a status indicator 918 to indicate that an asynchronous backup is scheduled for Tommy's Laptop. In addition, the remote backup system 102 generates and provides an indication of asynchronous backup settings 920 to indicate that the asynchronous backup is scheduled for the soonest availability of the desktop backup application installed on Tommy's Laptop and that all team data is scheduled to be backed up.

Additionally, the remote backup system 102 generates and provides the backup window 910. In particular, the remote backup system 102 generates the backup window 910 for Elise's Phone based on determining that Elise's user account has no backup device with an accessible desktop backup application. Accordingly, in response to a notification request from the client device 900 (e.g., based on selection of an indirect backup element), the remote backup system 102 provides a status indicator 922 to indicate that a backup notification has been to Elise's Phone. In some embodiments, the remote backup system 102 further facilitates managing and monitoring the indirect remote backup for Elise's Phone by establishing a connection with a web-based application on Elise's Phone which is monitoring a backup on a separate backup device. Accordingly, the remote backup system 102 can indirectly monitor and manage a remote backup by relaying backup instructions and status query instructions via Elise's Phone as a proxy. Thus, the remote backup system 102 generates and provides the indirect progress indicator 924 that indicates the backup progress of a backup device linked with Elise's Phone but not in direct communication with the remote backup system 102 and/or the team of user accounts within the content management system 106.

While FIG. 9 illustrates managing team backups on an account-specific basis, in some embodiments, the remote backup system 102 utilizes centralized, team-wide backup settings. For instance, the remote backup system 102 receives an indication from the client device 900 to set team backup settings that apply to all client devices of user accounts within the team. In some cases, the team-wide backup settings include indications that: i) all team member devices are backed up on a set interval (e.g., every Monday) or a set date/time, ii) all folders of a specific domain (e.g., "Desktop" or "Team Content") stored on team member devices are backed up, iii) no team member is allowed to back up an external hard drive as part of a team backup, iv) all content items of a particular type or format (e.g., PDFs) are backed up, and/or v) no content items of a particular type or formation (e.g., videos) are backed up. In some cases, the remote backup system 102 applies team-wide backup settings to all team member devices.

Figure 10:
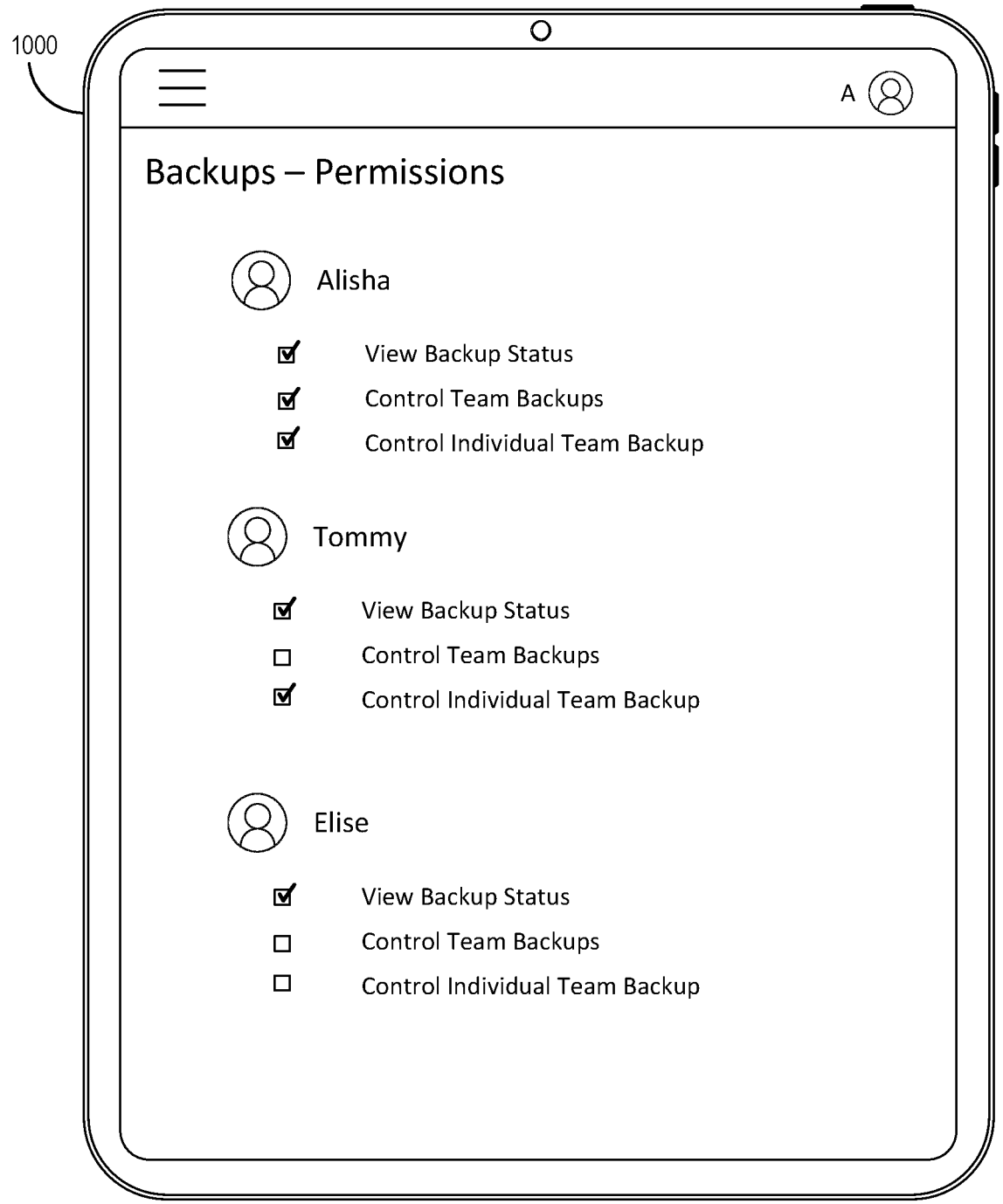
FIG. 10 illustrates an example backup permissions interface in accordance with one or more embodiments.

In certain described embodiments, the remote backup system 102 manages backup permissions associated with different user accounts. In particular, the remote backup system 102 sets and enforces permissions for different team accounts with respect to team backup instances from respective backup devices. FIG. 10 illustrates an example backup permissions interface for setting backup permissions in accordance with one or more embodiments.

As illustrated in FIG. 10, the client device 1000 (e.g., the client device 108*a*) presents or displays a backup permissions interface (e.g., as part of the client application 110) that includes permissions settings for different user accounts within a team. Indeed, the remote backup system 102 can enable the team administrator account (e.g., user account A) to monitor and manage permissions for team accounts on an account-specific basis. Accordingly, the remote backup system 102 generates the backup permissions interface to include selectable options for setting permissions for different team accounts. While FIG. 10 illustrates some example selectable options for various permissions, additional options and permissions settings are possible.

As shown, the remote backup system 102 receives user interactions selecting all three permissions options for Alisha's team account. Accordingly, the remote backup system 102 enables Alisha's team account to view backup status, control team backups, and control an individual team backup for Alisha's account. For example, based on the permissions settings, the remote backup system 102 allows Alisha's account to view status and progress associated with a team backup. In addition, the remote backup system 102 allows Alisha's account to control backup instances for different team devices within the team by creating, initiating, managing, pausing, resuming, and/or canceling backups for other team devices. Further, the remote backup system 102 allows Alisha's account to control the individual team backup from Alisha's PC as well.

As further shown, the remote backup system 102 receives selections of different permissions for Tommy's account. For example, the remote backup system 102 permits Tommy's account to view backup status and control an individual team backup, while preventing Tommy's account from controlling team backups for other team devices. Indeed, based on the selected permissions options, the remote backup system 102 allows Tommy's account to view the backup status for the team and control (e.g., by creating, initiating, managing, pausing, resuming, and/or canceling) the backup from Tommy's laptop while preventing control of any other team backups for other team devices.

Additionally, the remote backup system 102 receives selections of permissions for Elise's account. Specifically, the remote backup system 102 receives an indication to permit Elise's account to view backup status while preventing Elise's account from controlling team backups of other team accounts or an individual team account. Accordingly, the remote backup system 102 determines and enforces team account permissions on an account-specific basis for each user account within a team.

Figure 11:
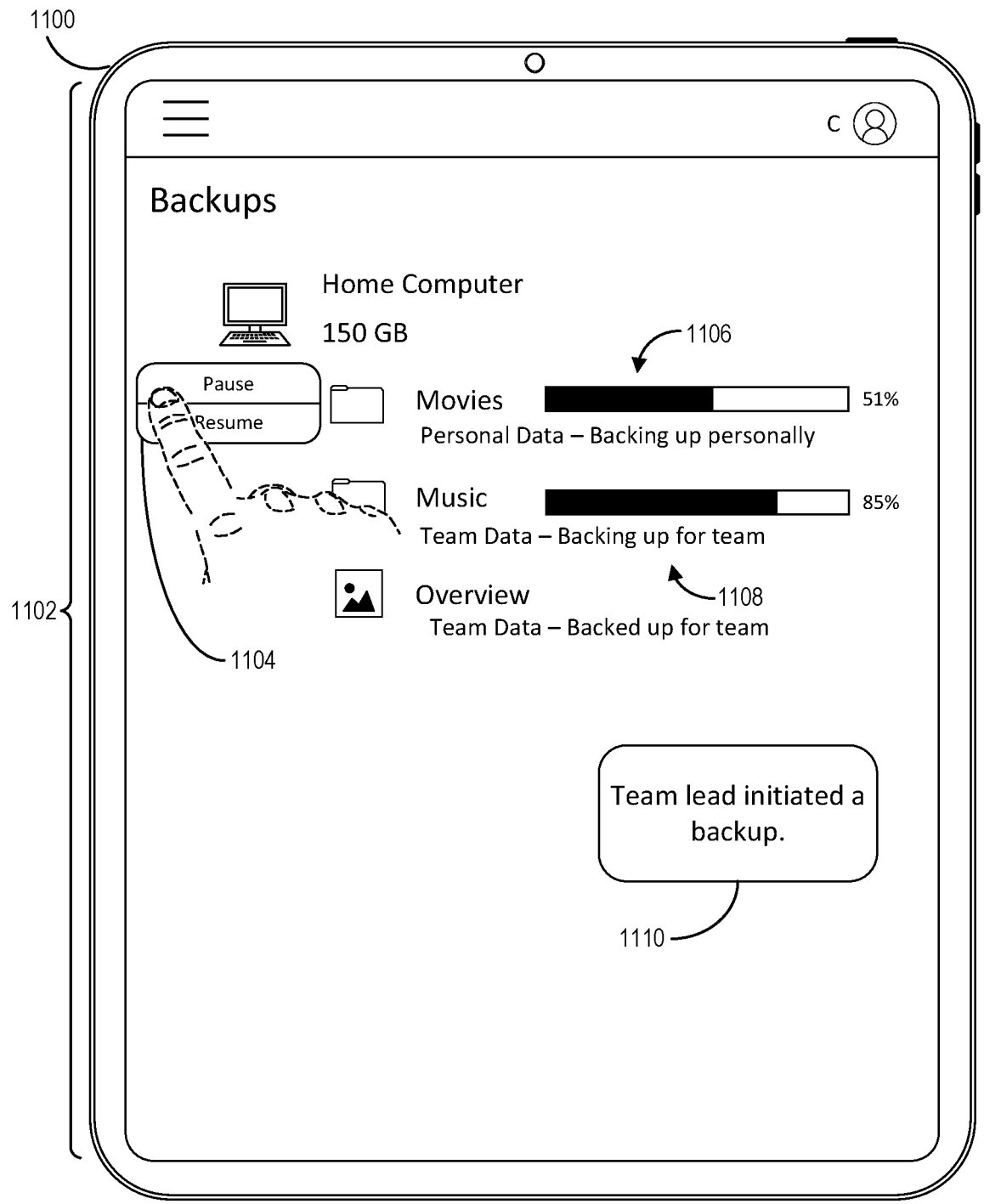
FIG. 11 illustrates an example backup permissions interface in accordance with one or more embodiments.

As mentioned above, in certain embodiments, the remote backup system 102 enables team accounts to perform certain backup functions in accordance with backup permissions. In particular, the remote backup system 102 provides remote backup interfaces for display on team devices associated with user accounts other than a team administrator account. FIG. 11 illustrates an example remote backup interface for a team account in accordance with one or more embodiments.

As illustrated in FIG. 11, a client device 1100 (e.g., the client device 108*a*) presents or displays a remote backup interface 1102 (e.g., as part of the client application 110) that includes various backup elements for the user account C (e.g., Tommy's user account). Indeed, the remote backup system 102 generates and provides the remote backup interface 1102 for display on the client device 1100 to present options and/or information according to backup permissions for user account C (e.g., as set by the team administrator account via a backup permissions interface). As shown, the remote backup system 102 generates and provides a remote backup interface that is a hybrid-type interface that includes interface elements in relation to team backups and personal backups for user account C. In some embodiments, the remote backup system 102 generates separate remote backup interfaces for individual backups and team backups.

As further illustrated in FIG. 11, the remote backup system 102 generates a backup control element 1104 that is located in relation to, and that controls the operation of, a personal data backup. To elaborate, the remote backup system 102 determines that the "Home Computer" for user account C is associated with multiple backup instances within the content management system 106, one for personal backups and one for team backups. Accordingly, the remote backup system 102 generates the backup control element 1104 for pausing and resuming the personal data backup executed by the Home Computer via the client device 1100. Additionally, the remote backup system 102 further generates and provides a backup progress indicator 1106 to indicate the progress of the personal data backup from the Home Computer.

In addition, the remote backup system 102 generates and provides a progress indicator 1108 to indicate the progress of backing up the Music folder as part of a team backup. Indeed, because the team administrator set user account C's permissions for viewing team backup status and controlling an individual team backup (e.g., the portion of the team backup that comes from user account C's Home Computer), the remote backup system 102 generates the remote backup interface 1102 to include the progress indicator 1108 and status indicators for content items backed up as part of the team backup.

In some embodiments, the remote backup system 102 generates and provides a backup notification 1110 to indicate that the team administrator account initiated a team backup. In some cases, the remote backup system 102 prevents user account C from terminating (or pausing or otherwise controlling) the team backup because the team administrator account disabled those permissions for user account C (as shown in FIG. 10). Indeed, the remote backup system 102 omits (or refrains from providing) backup control elements in relation to team-specific content items that are backed up as part of a team backup instance. In certain cases, the remote backup system 102 further prevents termination of backup functionality within the desktop backup application by user account C to ensure completion of the team backup without data corruption or incomplete data backup. In other cases, the remote backup system 102 tracks a backup progress and resumes an incomplete or partial backup (e.g., team backup) upon detecting that a backup device and/or its desktop backup application are once again accessible.

The components of the remote backup system 102 can include software, hardware, or both. For example, the components of the remote backup system 102 can include one or more instructions stored on a computer-readable storage medium and executable by processors of one or more computing devices. When executed by one or more processors, the computer-executable instructions of the remote backup system 102 can cause a computing device to perform the methods described herein. Alternatively, the components of the remote backup system 102 can comprise hardware, such as a special purpose processing device to perform a certain function or group of functions. Additionally or alternatively, the components of the remote backup system 102 can include a combination of computer-executable instructions and hardware.

Furthermore, the components of the remote backup system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the remote backup system 102 may be implemented as part of a stand-alone application on a personal computing device or a mobile device.

FIGS. 1-11, the corresponding text, and the examples provide a number of different systems and methods for creating, managing, and monitoring remote data backups. In addition to the foregoing, implementations can also be described in terms of flowcharts comprising acts steps in a method for accomplishing a particular result. For example, FIG. 12 illustrates an example series of acts for creating, managing, and monitoring remote data backups.

Figure 12:
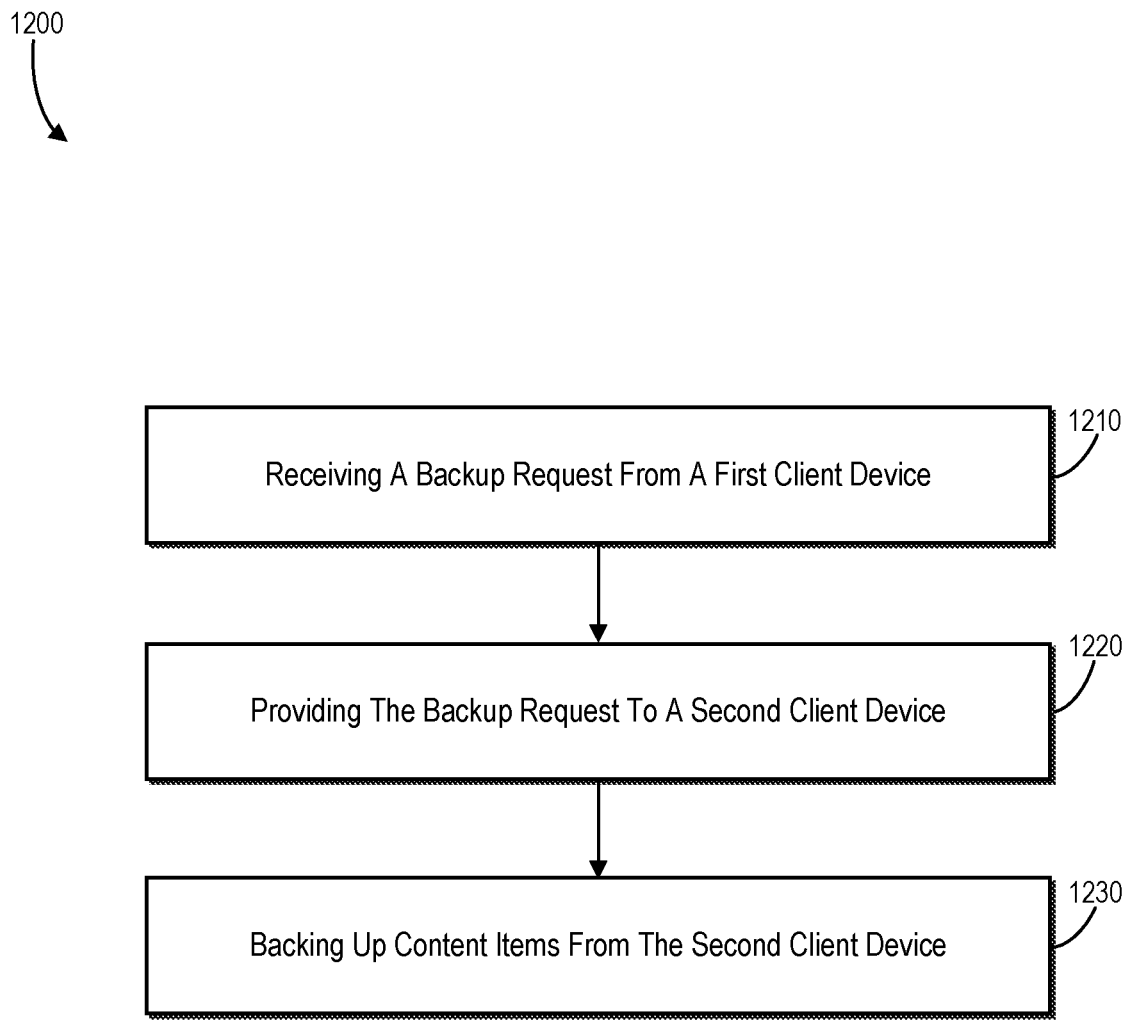
FIG. 12 illustrates a flowchart of a series of acts for generating and managing remote data backups in accordance with one or more embodiments.

While FIG. 12 illustrates acts according to certain implementations, alternative implementations may omit, add to, reorder, and/or modify any of the acts shown in FIG. 12. The acts of FIG. 12 can be performed as part of a method. Alternatively, a non-transitory computer-readable medium can comprise instructions, that when executed by one or more processors, cause a computing device to perform the acts of FIG. 12. In still further implementations, a system can perform the acts of FIG. 12.

As illustrated in FIG. 12, the series of acts 1200 may include an act 1210 of receiving a backup request from a first client device. In particular, the act 1210 can involve receiving, from a first client device associated with a user account of a content management system, a backup request for backing up content items stored at a second client device associated with the user account, wherein the second client device is located remotely from the first client device. In addition, the act 1200 may include an act 1220 of providing the backup request to a second client device. In particular, the act 1220 can involve providing the backup request to (a desktop application installed on) the second client device to cause the second client device to initiate a data backup for the content items stored at the second client device. As shown, the act 1200 can include an act 1230 of backing up content items from the second client device. In particular, the act 1230 can involve, in response to providing the backup request to the second client device, backing up the content items from the second client device to a backup location associated with the user account within the content management system.

In some embodiments, the series of acts 1200 includes an act of receiving the backup request from the first client device comprises receiving the backup request via a web-based application that does not include backup functionality. In these or other embodiments, the series of acts 1200 includes an act of providing the backup request to the second client device comprises establishing a connection between the web-based application at the first client device and a desktop application at the second client device, wherein the desktop application includes backup functionality. The series of acts 1200 can involve providing the backup request to the second client device comprises establishing a connection between a web-based application that submits the backup request from the first client device and a desktop application on the second client device that receives the backup request. In addition, the series of acts 1200 can involve backing up the content items from the second client device comprises generating, to provide to the second client device via the connection, a backup instruction that instructs the desktop application on the second client device to back up a content item stored at the second client device to the backup location within the content management system.

In one or more embodiments, the series of acts 1200 involves determining that a desktop application installed on the second client device for data backup is inaccessible in response to the backup request. In the same or other embodiments, the series of acts 1200 involves, based on determining that the desktop application is inaccessible, queueing the backup request until the desktop application is accessible to back up the content items from the second client device to the backup location within the content management system. The series of acts 1200 can also or alternatively involve determining that the backup request is a team backup request that requests backup for content items located at two or more client devices associated with user accounts within a team of user accounts of the content management system. Additionally, the series of acts 1200 can involve backing up the content items located at the two or more client devices as part of a team backup in response to the backup request.

In certain cases, the series of acts 1200 involves determining that the second client device is online in response to the backup request. The series of acts 1200 can also involve, based on determining that the second client device is online, providing a backup interface comprising synchronous backup elements for backing up the content items from the second client device in immediate response to the backup request. In some embodiments, the series of acts 1200 involves determining that the second client device is offline in response to the backup request. In one or more embodiments, the series of acts 1200 involves, based on determining that the second client device is offline, providing a backup interface comprising asynchronous backup elements for scheduling a data backup to back up the content items from the second client device.

The series of acts 1200 can include determining that the backup request is a team backup request that requests backup for content items located at two or more client devices associated with user accounts within a team of user accounts of the content management system. In addition, the series of acts 1200 can involve, based on determining that a first team client device of the two or more client devices is online, providing a backup interface comprising synchronous backup elements for backing up content items from the first team client device. Further, the series of acts 1200 can involve, based on determining that a second team client device of the two or more client devices is offline, providing asynchronous backup elements within the backup interface for scheduling backup of content items from the second team client device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
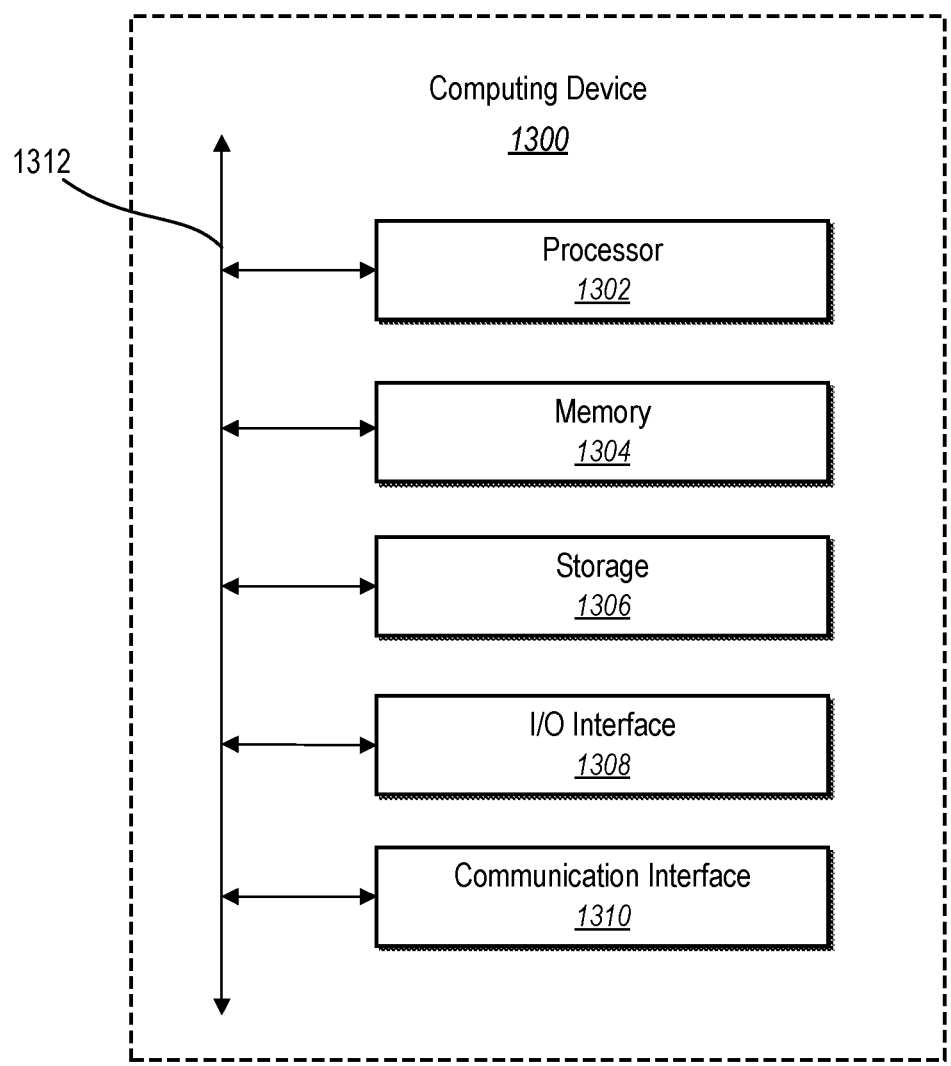
FIG. 13 illustrates a block diagram of an exemplary computing device in accordance with one or more embodiments.

FIG. 13 illustrates a block diagram of exemplary computing device 1300 (e.g., the server(s) 104 and/or the client devices 108*a*-108*n*) that may be configured to perform one or more of the processes described above. One will appreciate that server(s) 104 and/or the client devices 108a-108n may comprise one or more computing devices such as computing device 1300. As shown by FIG. 13, computing device 1300 can comprise processor 1302, memory 1304, storage device 1306, I/O interface 1308, and communication interface 1310, which may be communicatively coupled by way of communication infrastructure 1312. While an exemplary computing device 1300 is shown in FIG. 13, the components illustrated in FIG. 13 are not intended to be limiting. Additional or alternative components may be used in other implementations. Furthermore, in certain implementations, computing device 1300 can include fewer components than those shown in FIG. 13. Components of computing device 1300 shown in FIG. 13 will now be described in additional detail.

In particular implementations, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage device 1306 and decode and execute them. In particular implementations, processor 1302 may include one or more internal caches for data, instructions, or addresses. As an example and not by way of limitation, processor 1302 may include one or more instruction caches, one or more data caches, and one or more translation lookaside buffers (TLBs). Instructions in the instruction caches may be copies of instructions in memory 1304 or storage device 1306.

Memory 1304 may be used for storing data, metadata, and programs for execution by the processor(s). Memory 1304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1304 may be internal or distributed memory.

Storage device 1306 includes storage for storing data or instructions. As an example and not by way of limitation, storage device 1306 can comprise a non-transitory storage medium described above. Storage device 1306 may include a hard disk drive (HDD), a floppy disk drive, flash memory, an optical disc, a magneto-optical disc, magnetic tape, or a Universal Serial Bus (USB) drive or a combination of two or more of these. Storage device 1306 may include removable or non-removable (or fixed) media, where appropriate. Storage device 1306 may be internal or external to computing device 1300. In particular implementations, storage device 1306 is non-volatile, solid-state memory. In other implementations, Storage device 1306 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1308 allows a user to provide input to, receive output from, and otherwise transfer data to and receive data from computing device 1300. I/O interface 1308 may include a mouse, a keypad or a keyboard, a touch screen, a camera, an optical scanner, network interface, modem, other known I/O devices or a combination of such I/O interfaces. I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1308 is configured to provide graphical data to a display for presentation to a user. The graphical data may be representative of one or more graphical user interfaces and/or any other graphical content as may serve a particular implementation.

Communication interface 1310 can include hardware, software, or both. In any event, communication interface 1310 can provide one or more interfaces for communication (such as, for example, packet-based communication) between computing device 1300 and one or more other computing devices or networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1310 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1310 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1310 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1312 may include hardware, software, or both that couples components of computing device 1300 to each other. As an example and not by way of limitation, communication infrastructure 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 14:
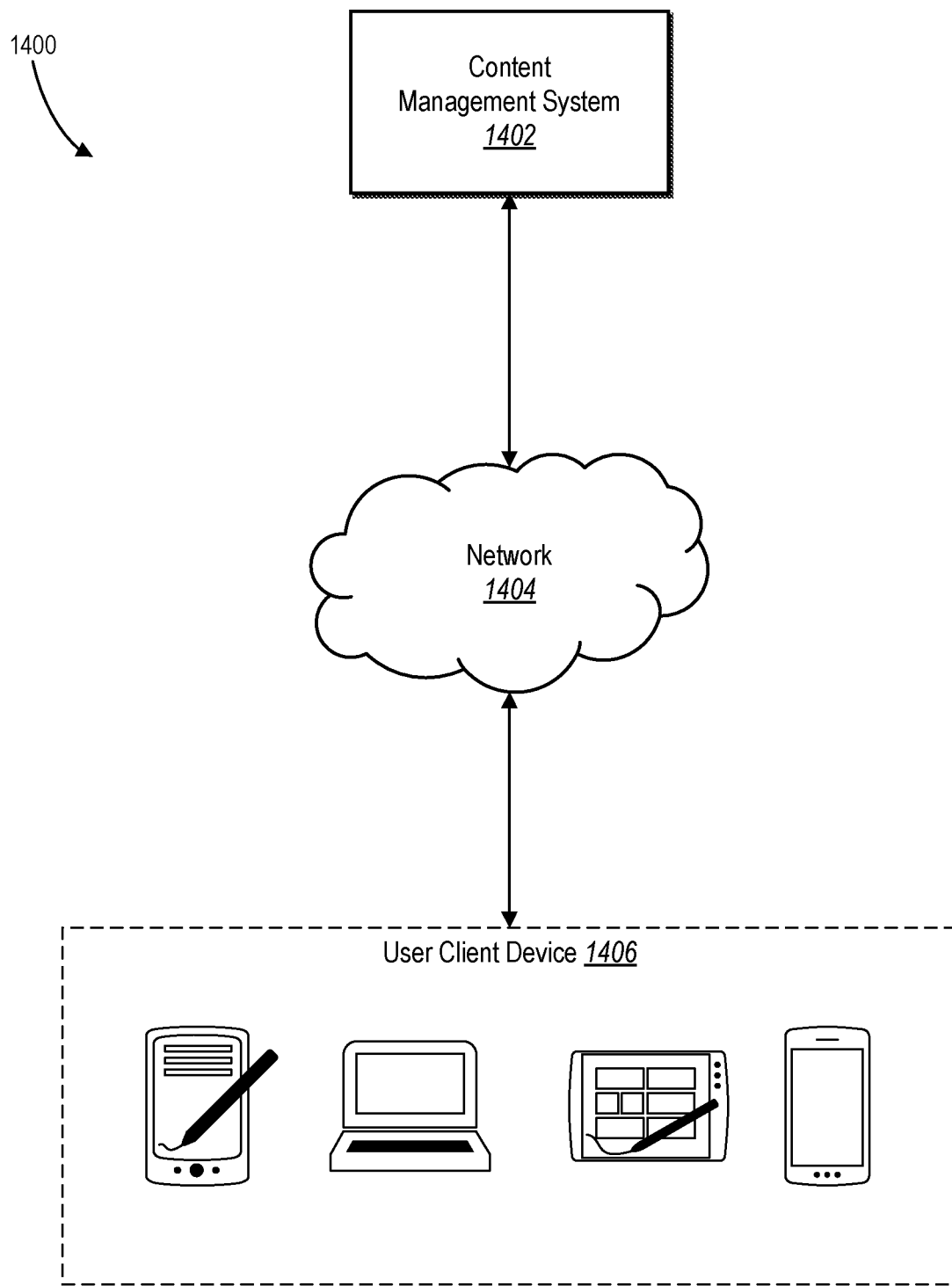
FIG. 14 illustrates an example environment of a networking system having the remote backup system in accordance with one or more embodiments.

FIG. 14 is a schematic diagram illustrating environment 1400 within which one or more implementations of the remote backup system 102 can be implemented. For example, the remote backup system 102 may be part of a content management system 1402 (e.g., the content management system 106). Content management system 1402 may generate, store, manage, receive, and send digital content (such as digital content items). For example, content management system 1402 may send and receive digital content to and from client devices 1406 by way of network 1404. In particular, content management system 1402 can store and manage a collection of digital content. Content management system 1402 can manage the sharing of digital content between computing devices associated with a plurality of users. For instance, content management system 1402 can facilitate a user sharing a digital content with another user of content management system 1402.

In particular, content management system 1402 can manage synchronizing digital content across multiple client devices 1406 associated with one or more users. For example, a user may edit digital content using client device 1406. The content management system 1402 can cause client device 1406 to send the edited digital content to content management system 1402. Content management system 1402 then synchronizes the edited digital content on one or more additional computing devices.

In addition to synchronizing digital content across multiple devices, one or more implementations of content management system 1402 can provide an efficient storage option for users that have large collections of digital content. For example, content management system 1402 can store a collection of digital content on content management system 1402, while the client device 1406 only stores reduced-sized versions of the digital content. A user can navigate and browse the reduced-sized versions (e.g., a thumbnail of a digital image) of the digital content on client device 1406. In particular, one way in which a user can experience digital content is to browse the reduced-sized versions of the digital content on client device 1406.

Another way in which a user can experience digital content is to select a reduced-size version of digital content to request the full- or high-resolution version of digital content from content management system 1402. In particular, upon a user selecting a reduced-sized version of digital content, client device 1406 sends a request to content management system 1402 requesting the digital content associated with the reduced-sized version of the digital content. Content management system 1402 can respond to the request by sending the digital content to client device 1406. Client device 1406, upon receiving the digital content, can then present the digital content to the user. In this way, a user can have access to large collections of digital content while minimizing the amount of resources used on client device 1406.

Client device 1406 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1406 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1404.

Network 1404 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1406 may access content management system 1402.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   receiving, from a first client device associated with a user account of a content management system, a backup request for backing up content items stored at a second client device associated with the user account;
   queuing the backup request in a backup request queue for a desktop application at the second client device to back up the content items from the second client device based on the backup request received from the first client device;
   establishing a cross-application connection between a web-based application at the first client device and the desktop application at the second client device, wherein the cross-application connection facilitates remote execution of desktop-based data backup functions at the second client device in response to interactions with the web-based application at the first client device;

in response to receiving the backup request from the first client device and based on establishing the cross-application connection, providing the backup request from the backup request queue to the second client device, triggering a backup function of the desktop application at the second client device through the cross-application connection to initiate a data backup for the content items stored at the second client device by implementing one or more of the desktop-based data backup functions; and based on providing the backup request to the second client device, backing up the content items from the second client device to a backup location associated with the user account within the content management system.

2. The method of claim 1, wherein:

receiving the backup request from the first client device comprises receiving the backup request via the web-based application that does not include backup functionality; and providing the backup request to the second client device comprises providing the backup request via the cross-application connection between the web-based application at the first client device and the desktop application at the second client device.

3. The method of claim 1, wherein:

backing up the content items from the second client device comprises generating, to provide to the second client device via the cross-application connection, a backup instruction that instructs the desktop application on the second client device to execute the backup function to back up a content item stored at the second client device to the backup location within the content management system.

4. The method of claim 1, wherein backing up the content items from the second client device comprises:

determining that the desktop application installed on the second client device for data backup is inaccessible in response to the backup request; and based on determining that the desktop application is inaccessible, queueing the backup request until the desktop application is accessible to back up the content items from the second client device to the backup location within the content management system.

5. The method of claim 1, wherein backing up the content items from the second client device comprises:

determining that the backup request is a team backup request that requests backup for content items located at two or more client devices associated with user accounts within a team of user accounts of the content management system; and backing up the content items located at the two or more client devices as part of a team backup in response to the backup request.

6. The method of claim 1, further comprising:

determining that the second client device is online in response to the backup request; and based on determining that the second client device is online, providing a backup interface comprising synchronous backup elements for backing up the content items from the second client device in immediate response to the backup request.

7. The method of claim 1, further comprising:

determining that the second client device is offline in response to the backup request; and based on determining that the second client device is offline, providing a backup interface comprising asynchronous backup elements for scheduling a data backup to back up the content items from the second client device.

8. A system comprising:

at least one processor; and a non-transitory computer readable medium comprising instructions that, when executed by the at least one processor, cause the system to:

receive, from a first client device associated with a user account of a content management system, a backup request for backing up content items stored at a second client device associated with the user account, wherein the second client device is located remotely from the first client device;

queue the backup request in a backup request queue for a desktop application at the second client device to back up the content items from the second client device based on the backup request received from the first client device;

establish a cross-application connection between a web-based application at the first client device and the desktop application at the second client device, wherein the cross-application connection facilitates remote execution of desktop-based data backup functions at the second client device in response to interactions with the web-based application at the first client device;

in response to receiving the backup request from the first client device and based on establishing the cross-application connection, provide the backup request from the backup request queue to the second client device, triggering a backup function of the desktop application at the second client device through the cross-application connection to initiate a data backup for the content items stored at the second client device by implementing one or more of the desktop-based data backup functions; and based on providing the backup request to the second client device, back up the content items from the second client device to a backup location associated with the user account within the content management system.

9. The system of claim 8, further comprising instructions that, when executed by the at least one processor, cause the system to:

receive the backup request from the first client device by receiving the backup request via the web-based application that does not include backup functionality; and provide the backup request to the second client device by providing the backup request via the cross-application connection between the web-based application at the first client device and the desktop application at the second client device.

10. The system of claim 8, further comprising instructions that, when executed by the at least one processor, cause the system to:

back up the content items from the second client device by generating, to provide to the second client device via the cross-application connection, a backup instruction that instructs the desktop application on the second client device to execute the backup function to back up a content item stored at the second client device to the backup location within the content management system.

11. The system of claim 8, further comprising instructions that, when executed by the at least one processor, cause the system to:

determine that the desktop application installed on the second client device for data backup is inaccessible in response to the backup request; and based on determining that the desktop application is inaccessible, queue the backup request until the desktop application is accessible to back up the content items from the second client device to the backup location within the content management system.

12. The system of claim 8, further comprising instructions that, when executed by the at least one processor, cause the system to back up the content items from the second client device by:

determining that the backup request is a team backup request that requests backup for content items located at two or more client devices associated with user accounts within a team of user accounts of the content management system; and backing up the content items located at the two or more client devices as part of a team backup in response to the backup request.

13. The system of claim 8, further comprising instructions that, when executed by the at least one processor, cause the system to:

determine that the second client device is online in response to the backup request; and based on determining that the second client device is online, provide a backup interface comprising synchronous backup elements for backing up the content items from the second client device in immediate response to the backup request.

14. The system of claim 8, further comprising instructions that, when executed by the at least one processor, cause the system to:

determining that the second client device is offline in response to the backup request; and based on determining that the second client device is offline, providing a backup interface comprising asynchronous backup elements for scheduling a data backup to back up the content items from the second client device.

15. A non-transitory computer readable medium comprising instructions that, when executed by at least one processor, cause the at least one processor to:

receive, from a web-based application installed on a first client device associated with a user account of a content management system, a backup request for backing up content items stored at a second client device associated with the user account;

queue the backup request in a backup request queue for a desktop application at the second client device to back up the content items from the second client device based on the backup request received from the first client device;

establish a cross-application connection between the web-based application at the first client device and the desktop application at the second client device, wherein the cross-application connection facilitates remote execution of desktop-based data backup functions at the second client device in response to interactions with the web-based application at the first client device;

in response to receiving the backup request from the first client device and based on establishing the cross-application connection, provide the backup request from the backup request queue to a desktop application installed on the second client device, triggering a backup function of the desktop application at the second client device through the cross-application connection to initiate a data backup for the content items stored at the second client device by implementing one or more of the desktop-based data backup functions; and based on providing the backup request to the second client device, back up the content items from the second client device to a backup location associated with the user account within the content management system.

16. The non-transitory computer readable medium of claim 15, further comprising instructions that, when executed by the at least one processor, cause the at least one processor to:

receive the backup request from the first client device by receiving the backup request via the web-based application that does not include backup functionality; and provide the backup request to the second client device by providing the backup request via the cross-application connection between the web-based application at the first client device and the desktop application at the second client device.

17. The non-transitory computer readable medium of claim 15, further comprising instructions that, when executed by the at least one processor, cause the at least one processor to:

back up the content items from the second client device by generating, to provide to the second client device via the cross-application connection, a backup instruction that instructs the desktop application on the second client device to execute the backup function to back up a content item stored at the second client device to the backup location within the content management system.

18. The non-transitory computer readable medium of claim 15, further comprising instructions that, when executed by the at least one processor, cause the at least one processor to:

determine that the desktop application installed on the second client device for data backup is inaccessible in response to the backup request; and based on determining that the desktop application is inaccessible, queue the backup request until the desktop application is accessible to back up the content items from the second client device to the backup location within the content management system.

19. The non-transitory computer readable medium of claim 15, further comprising instructions that, when executed by the at least one processor, cause the at least one processor to back up the content items from the second client device by:

determining that the backup request is a team backup request that requests backup for content items located at two or more client devices associated with user accounts within a team of user accounts of the content management system; and backing up the content items located at the two or more client devices as part of a team backup in response to the backup request.

20. The non-transitory computer readable medium of claim 15, further comprising instructions that, when executed by the at least one processor, cause the at least one processor to:

determine that the backup request is a team backup request that requests backup for content items located at two or more client devices associated with user accounts within a team of user accounts of the content management system;

based on determining that a first team client device of the two or more client devices is online, provide a backup interface comprising synchronous backup elements for backing up content items from the first team client device; and based on determining that a second team client device of the two or more client devices is offline, provide asynchronous backup elements within the backup interface for scheduling backup of content items from the second team client device.

\* \* \* \* \*